(12) United States Patent  
Govindan et al.

(10) Patent No.: US 10,308,537 B2  
(45) Date of Patent: Jun. 4, 2019

(54) DESALINATION SYSTEMS AND ASSOCIATED METHODS

(71) Applicant: Gradiant Corporation, Woburn, MA (US)

(72) Inventors: Prakash Narayan Govindan, Melrose, MA (US); Steven Lam, Medford, MA (US); Maximus G. St. John, Boston, MA (US); Mark Zaloudek, Pepperell, MA (US); Anurag Bajpayee, Cambridge, MA (US)

(73) Assignee: Gradiant Corporation, Woburn, MA (US)

( * ) Notice: Subject to any disclaimer, the term of this patent is extended or adjusted under 35 U.S.C. 154(b) by 703 days.

(21) Appl. No.: 14/494,101

(22) Filed: Sep. 23, 2014

(65) Prior Publication Data

US 2015/0083577 A1   Mar. 26, 2015

Related U.S. Application Data

(60) Provisional application No. 61/988,034, filed on May 2, 2014, provisional application No. 61/908,263, filed
(Continued)

(51) Int. Cl.
*C02F 9/00* (2006.01)
*B01D 1/30* (2006.01)
(Continued)

(52) U.S. Cl.
CPC ............... *C02F 9/00* (2013.01); *B01D 1/30* (2013.01); *C02F 1/04* (2013.01); *C02F 1/042* (2013.01);
(Continued)

(58) Field of Classification Search
CPC .. B01D 1/0011; B01D 1/0041; B01D 1/0047; B01D 1/0094; B01D 1/30; B01D 3/00; B01D 3/007; B01D 5/0033; B01D 5/0054; B01D 5/0078; B01D 1/0082; B01D 5/006; B01D 2311/04; B01D 2311/08; B01D 2311/26; B01D 2311/2623; B01D 2311/2642; B01D 2311/2653;
(Continued)

(56) References Cited

U.S. PATENT DOCUMENTS 2,151,990 A    3/1939  Ruys
2,606,820 A    8/1952  Viggo
(Continued)

FOREIGN PATENT DOCUMENTS

CA   2 779 732 A1   12/2012
CA   2818055        11/2013
(Continued)

OTHER PUBLICATIONS

International Search Report and Written Opinion dated Jan. 26, 2015 for Application No. PCT/US2014/056997.
(Continued)

*Primary Examiner* — Joseph W Drodge
(74) *Attorney, Agent, or Firm* — Wolf, Greenfield & Sacks, P.C.

(57) ABSTRACT

Systems and methods related to the desalination of aqueous solutions containing one or more dissolved salts are generally described.

23 Claims, 14 Drawing Sheets

Related U.S. Application Data on Nov. 25, 2013, provisional application No. 61/906,620, filed on Nov. 20, 2013, provisional application No. 61/881,365, filed on Sep. 23, 2013.

(51) Int. Cl.

| | |
|---|---|
| *C02F 1/42* | (2006.01) |
| *C02F 1/46* | (2006.01) |
| *C02F 1/52* | (2006.01) |
| *C02F 5/02* | (2006.01) |
| *C02F 1/04* | (2006.01) |
| C02F 1/463 | (2006.01) |
| C02F 103/08 | (2006.01) |

(52) U.S. Cl.
CPC ............ *C02F 1/42* (2013.01); *C02F 1/463* (2013.01); *C02F 1/52* (2013.01); *C02F 5/02* (2013.01); *C02F 2001/425* (2013.01); *C02F 2001/5218* (2013.01); *C02F 2103/08* (2013.01); *C02F 2201/007* (2013.01); *C02F 2301/046* (2013.01); *Y02A 20/128* (2018.01)

(58) Field of Classification Search
CPC .... B01D 2311/2657; B01D 2311/2673; B01D 61/02; B01D 61/025; B01D 61/04; B01D 61/10; C02F 1/04; C02F 1/042; C02F 1/048; C02F 1/14; C02F 1/16; C02F 1/28; C02F 1/42; C02F 1/52; C02F 1/66; C02F 1/68; C02F 9/00; C02F 2303/22; C02F 1/041; C02F 1/445; C02F 5/02; C02F 2209/02; C02F 2209/03; C02F 2305/00; C02F 2101/10; C02F 2301/046; C02F 1/463; C02F 2201/007; C02F 2001/425; C02F 2001/5218; C02F 2103/08; C02F 1/44; C02F 1/441; C02F 1/447
USPC ..... 95/46, 52, 241, 243, 247, 250, 254, 259, 95/266; 203/10, 11, 39; 210/637, 652, 210/660, 663, 669, 696, 702, 712, 805, 210/806
See application file for complete search history.

(56) References Cited

U.S. PATENT DOCUMENTS

| | | |
|---|---|---|
| 2,606,839 A | 8/1952 | Evans |
| 2,640,018 A | 5/1953 | Heath |
| 2,997,856 A | 8/1961 | Pike |
| 3,032,482 A | 5/1962 | Shoemaker |
| 3,042,606 A * | 7/1962 | Salutsky .......... C02F 5/04 210/665 |
| 3,080,302 A | 3/1963 | Rogers et al. |
| 3,236,747 A | 2/1966 | Margiloff |
| 3,331,773 A | 7/1967 | Gunderson et al. |
| 3,454,490 A | 7/1969 | Wallace |
| 3,489,652 A | 1/1970 | Williamson |
| 3,625,761 A | 12/1971 | Tate |
| 3,725,209 A | 4/1973 | Rosa |
| 3,922,154 A | 11/1975 | Kawasaki et al. |
| 3,926,739 A | 12/1975 | Izumi |
| 4,224,148 A | 9/1980 | Lindman et al. |
| 4,251,367 A | 2/1981 | Santora |
| 4,334,886 A | 6/1982 | Tani et al. |
| 4,452,696 A | 6/1984 | Lopez |
| 4,511,436 A | 4/1985 | El Din et al. |
| 4,563,337 A | 1/1986 | Kim |
| 4,576,724 A | 3/1986 | Colman et al. |
| 4,708,805 A | 11/1987 | D'Muhala |
| 4,735,722 A | 4/1988 | Krepak |
| 4,755,298 A | 7/1988 | Grinstead |
| 4,770,775 A | 9/1988 | Lopez |
| 4,806,244 A | 2/1989 | Guilhem |
| 4,843,828 A | 7/1989 | Gladman |
| 4,944,882 A | 7/1990 | Ray et al. |
| 4,956,157 A | 9/1990 | Nasu |
| 4,973,201 A | 11/1990 | Paul et al. |
| 4,980,077 A | 12/1990 | Morris et al. |
| 4,981,593 A | 1/1991 | Priestley et al. |
| 5,015,391 A | 5/1991 | Mohn |
| 5,053,132 A | 10/1991 | Sirkar |
| 5,167,828 A | 12/1992 | Emmons et al. |
| 5,190,656 A | 3/1993 | Paul et al. |
| 5,225,087 A | 7/1993 | Kardos |
| 5,238,574 A | 8/1993 | Kawahima et al. |
| 5,250,185 A | 10/1993 | Tao et al. |
| 5,282,995 A | 2/1994 | Paul et al. |
| 5,328,616 A | 7/1994 | Martyak et al. |
| 5,425,902 A | 6/1995 | Miller et al. |
| 5,453,205 A | 9/1995 | Browne |
| 5,464,540 A | 11/1995 | Friesen et al. |
| 5,656,161 A | 8/1997 | Solomon et al. |
| 5,840,195 A | 11/1998 | Delsalle et al. |
| 6,010,631 A | 1/2000 | Delsalle et al. |
| 6,056,878 A | 5/2000 | Tessier et al. |
| 6,062,070 A | 5/2000 | Maltby et al. |
| 6,113,797 A * | 9/2000 | Al-Samadi ........... B01D 61/022 210/650 |
| 6,146,525 A | 11/2000 | Li et al. |
| 6,187,200 B1 | 2/2001 | Yamamura et al. |
| 6,190,556 B1 | 2/2001 | Uhlinger |
| 6,270,671 B1 | 8/2001 | Shorr et al. |
| 6,319,409 B1 | 11/2001 | Saitou et al. |
| 6,416,668 B1 | 7/2002 | Al-Samadi et al. |
| 6,423,235 B1 | 7/2002 | Shimoi et al. |
| 6,440,310 B1 | 8/2002 | Shorr et al. |
| 6,461,514 B1 * | 10/2002 | Al-Samadi ........... B01D 61/022 210/638 |
| 6,508,936 B1 | 1/2003 | Hassan |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot |
| 7,225,620 B2 | 6/2007 | Klausner et al. |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |
| 7,465,376 B2 | 12/2008 | Neubert et al. |
| 7,510,656 B2 | 3/2009 | Shafer et al. |
| 7,520,993 B1 | 4/2009 | Laraway et al. |
| 7,527,726 B2 | 5/2009 | Slough et al. |
| 7,597,784 B2 | 10/2009 | Bednarek et al. |
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,824,552 B2 | 11/2010 | Slabaugh et al. |
| 7,950,921 B1 | 5/2011 | Woolsey |
| 7,964,101 B2 | 6/2011 | Slough et al. |
| 8,012,358 B2 | 9/2011 | Slabaugh et al. |
| 8,043,509 B2 | 10/2011 | Thiers |
| 8,119,007 B2 | 2/2012 | Bajpayee et al. |
| 8,147,696 B1 | 4/2012 | Pandya |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,469,092 B2 | 6/2013 | Curole et al. |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,678,080 B2 | 3/2014 | Curole et al. |

(56) References Cited

U.S. PATENT DOCUMENTS

| | | |
|---|---|---|
| 8,679,347 B2 | 3/2014 | Al-Samadi |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1* | 4/2015 | Zuback ............... C02F 1/42 210/659 |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,221,694 B1* | 12/2015 | Govindan ............. C02F 1/042 |
| 9,266,748 B1 | 2/2016 | Govindan et al. |
| 9,266,762 B2* | 2/2016 | Wang |
| 9,428,404 B2 | 8/2016 | Bajpayee et al. |
| 9,550,685 B2 | 1/2017 | Klausner et al. |
| 9,556,041 B2* | 1/2017 | Govindan ............. C02F 1/042 |
| 9,617,179 B2 | 4/2017 | Govindan et al. |
| 9,700,811 B2 | 7/2017 | Govindan et al. |
| 9,957,180 B2 | 5/2018 | Govindan et al. |
| 9,969,638 B2 | 5/2018 | Govindan et al. |
| 2003/0106860 A1 | 6/2003 | Peloquin et al. |
| 2003/0132166 A1 | 7/2003 | Rey |
| 2004/0187897 A1 | 9/2004 | Kenowski et al. |
| 2005/0023222 A1 | 2/2005 | Baillie |
| 2006/0060532 A1* | 3/2006 | Davis ............... B01D 61/022 210/652 |
| 2006/0150892 A1* | 7/2006 | Mayer ............... C01D 3/24 117/2 |
| 2006/0157409 A1 | 7/2006 | Hassan |
| 2006/0157410 A1 | 7/2006 | Hassan |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | den Boestert et al. |
| 2007/0181480 A1 | 8/2007 | Lee |
| 2007/0235391 A1 | 10/2007 | Ylikangas et al. |
| 2008/0073200 A1 | 3/2008 | Godshall et al. |
| 2008/0102119 A1 | 5/2008 | Grovender |
| 2008/0116134 A1 | 5/2008 | Cartwright |
| 2008/0121585 A1* | 5/2008 | Mavis ............... C02F 1/441 210/652 |
| 2008/0277344 A1 | 11/2008 | Sengupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0173096 A1 | 7/2009 | Wohlert |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0163471 A1* | 7/2010 | Elyanow ............. B01D 61/022 210/176 |
| 2010/0163472 A1 | 7/2010 | Thiers et al. |
| 2010/0234795 A1 | 9/2010 | Wallenäs |
| 2010/0242995 A1 | 9/2010 | Xiong et al. |
| 2010/0282675 A1 | 11/2010 | Sengupta et al. |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056878 A1 | 3/2011 | Matsushiro et al. |
| 2011/0094965 A1* | 4/2011 | Al-Samadi ......... B01D 61/022 210/652 |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1* | 7/2011 | Cordatos ............. B01D 61/364 210/640 |
| 2011/0198285 A1 | 8/2011 | Wallace |
| 2011/0215039 A1* | 9/2011 | Acernese ........... B01D 61/025 210/172.4 |
| 2011/0257788 A1 | 10/2011 | Wiemers et al. |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0037568 A1 | 2/2012 | Karrs et al. |
| 2012/0067820 A1 | 3/2012 | Henthorne et al. |
| 2012/0090833 A1 | 4/2012 | Ligtheim et al. |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0160753 A1* | 6/2012 | Vora ............... B01D 61/022 210/175 |
| 2012/0199524 A1 | 8/2012 | Bly et al. |
| 2012/0199534 A1 | 8/2012 | Holtzapple et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | Sengupta et al. |
| 2012/0267307 A1 | 10/2012 | McGinnis |
| 2012/0279396 A1 | 11/2012 | Brammer et al. |
| 2012/0292259 A1 | 11/2012 | Marcin |
| 2012/0312755 A1 | 12/2012 | Ryan et al. |
| 2013/0008079 A1 | 1/2013 | Chung et al. |
| 2013/0043190 A1* | 2/2013 | Al-Samadi ......... B01D 61/025 210/652 |
| 2013/0056193 A1 | 3/2013 | Thiers |
| 2013/0074694 A1 | 3/2013 | Govindan et al. |
| 2013/0075098 A1 | 3/2013 | Janjua et al. |
| 2013/0075940 A1 | 3/2013 | Govindan et al. |
| 2013/0087501 A1* | 4/2013 | Moe ............... C02F 1/042 210/652 |
| 2013/0092626 A1 | 4/2013 | Zimmerman et al. |
| 2013/0105323 A1 | 5/2013 | Averbeck et al. |
| 2013/0118887 A1 | 5/2013 | Frolov et al. |
| 2013/0193074 A1 | 8/2013 | Voigt et al. |
| 2013/0213892 A1 | 8/2013 | Henthorne |
| 2013/0233786 A1 | 9/2013 | Posa |
| 2013/0240442 A1 | 9/2013 | Chidambaran et al. |
| 2013/0318743 A1 | 12/2013 | Chinta et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Passarelli |
| 2014/0067958 A1* | 3/2014 | Bradley ............. G06Q 30/0241 709/204 |
| 2014/0069821 A1 | 3/2014 | Marcin et al. |
| 2014/0116956 A1 | 5/2014 | Yuan et al. |
| 2014/0151300 A1* | 6/2014 | Savage ............... C02F 9/00 210/638 |
| 2014/0197022 A1 | 7/2014 | Antar et al. |
| 2014/0197029 A1 | 7/2014 | Sparrow et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0083656 A1 | 3/2015 | Williams |
| 2015/0107840 A1 | 4/2015 | Ligthelm et al. |

(56) References Cited

U.S. PATENT DOCUMENTS

| | | | |
|---|---|---|---|
| 2015/0107841 A1 | 4/2015 | Suijkerbuijk et al. |
| 2015/0129410 A1 | 5/2015 | Govindan et al. |
| 2015/0353397 A1 | 12/2015 | Cath et al. |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0244349 A1 | 8/2016 | St. John et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2017/0036171 A1 | 2/2017 | Lienhard et al. |
| 2017/0044033 A1 | 2/2017 | Lienhard et al. |
| 2017/0144906 A1 | 5/2017 | Andrews et al. |
| 2017/0174543 A1 | 6/2017 | Govindan et al. |
| 2018/0008919 A1 | 1/2018 | Tierney, III et al. |
| 2018/0236372 A1 | 8/2018 | Govindan et al. |
| 2018/0236406 A1 | 8/2018 | St. John et al. |
| 2018/0244545 A1 | 8/2018 | St. John et al. |

FOREIGN PATENT DOCUMENTS

| | | |
|---|---|---|
| CA | 2821453 | 1/2014 |
| CA | 2816746 | 4/2014 |
| CA | 2821458 | 7/2014 |
| CN | 1623936 A | 6/2005 |
| CN | 1856447 A | 11/2006 |
| CN | 100999364 A | 7/2007 |
| CN | 101056693 A | 10/2007 |
| CN | 101397152 A | 4/2009 |
| CN | 101636354 A | 1/2010 |
| CN | 101717161 A | 6/2010 |
| CN | 102143786 A | 8/2011 |
| CN | 102438957 A | 5/2012 |
| CN | 102725236 A | 10/2012 |
| CN | 102933507 A | 2/2013 |
| DE | 2145861 A1 | 9/1972 |
| EP | 0 207 390 | 1/1987 |
| EP | 0 253 287 A1 | 1/1988 |
| EP | 0 623 561 A1 | 11/1994 |
| EP | 1 775 267 A2 | 4/2007 |
| FR | 1582201 A | 9/1969 |
| FR | 2561637 A1 | 9/1985 |
| GB | 821939 A | 10/1959 |
| GB | 1013767 A | 12/1965 |
| GB | 1036920 A | 7/1966 |
| GB | 1444241 A | 7/1976 |
| GB | 2395946 A | 6/2004 |
| JP | 55-147199 | 11/1980 |
| JP | H05-208199 A | 8/1993 |
| KR | 101229482 B1 | 2/2013 |
| WO | WO 95/27683 | 10/1995 |
| WO | WO 00/00273 A1 | 1/2000 |
| WO | WO 01/14256 A1 | 3/2001 |
| WO | WO 02/32813 A1 | 4/2002 |
| WO | WO 2005/012185 | 2/2005 |
| WO | WO 2007/128062 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/159743 A1 | 12/2011 |
| WO | WO 2012/138502 A1 | 10/2012 |
| WO | WO 2012/142396 A1 | 10/2012 |
| WO | WO 2012/159203 | 11/2012 |
| WO | WO 2013/012548 A1 | 1/2013 |
| WO | WO 2013/037047 | 3/2013 |
| WO | WO 2013/078124 A1 | 5/2013 |
| WO | WO 2013/158315 A1 | 10/2013 |
| WO | WO 2013/159220 | 10/2013 |
| WO | WO 2015/021062 A1 | 2/2014 |
| WO | WO 2014/058696 | 4/2014 |
| WO | WO 2014/088826 A1 | 6/2014 |
| WO | WO 2014/121153 | 8/2014 |
| WO | WO 2014/144778 A1 | 9/2014 |
| WO | WO 2014/150848 A1 | 9/2014 |
| WO | WO 2014/162094 | 10/2014 |
| WO | WO 2014/188450 A1 | 11/2014 |
| WO | WO 2014/200829 | 12/2014 |
| WO | WO 2015/038983 A2 | 3/2015 |
| WO | WO 2015/042584 A1 | 3/2015 |
| WO | WO 2015/061194 A1 | 4/2015 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |

OTHER PUBLICATIONS

Al-Hallaj et al., Solar desalination with a humidification-dehumidification cycle: performance unit. Desalination. 1998;120:273-80.

El-Dessouky et al., Multiple-effect evaporation desalination systems: thermal analysis. Desalination. 1999;125:259-76.

Global Water Intelligence, Water Desalination Report. Tom Pankratz, ed. Dec. 17, 2012;48(48):1-4.

Klausner et al., Evaporative heat and mass transfer for the diffusion driven desalination process. Heat Mass Transfer. 2006;42:528-36.

Narayan et al., The potential of solar-driven humidification-dehumidification desalination for small-scale decentralized water production. Renewable and Sustainable Energy Reviews. 2010;14:1187-1201.

Narayan et al., Thermal design of the humidification desalination system: an experimental investigation. International Journal of Heat and Mass Transfer. 2013;58:1-9.

Narayan et al., Thermodynamic balancing of the humidification dehumidification desalination system by mass extraction and injection. International Journal of Heat and Mass Transfer. 2013;57:756-70.

Zamen et al., Improvement of solar humidification-dehumidification desalination using multi-stage process. 6 pages. Accessed Jun. 6, 2014.

Office Action dated Dec. 19, 2016 for U.S. Appl. No. 14/452,387.

Notice of Allowance dated May 12, 2017 for U.S. Appl. No. 14/452,387.

Office Action dated Feb. 27, 2017 for CN App. No. 201480052403.9.

International Preliminary Report on Patentability (Chapter II) dated Jan. 11, 2016 for PCT App. No. PCT/US2014/056997.

International Search Report and Written Opinion dated May 23, 2014 for PCT App. No. PCT/US2014/024384.

Office Action dated Apr. 15, 2016 for U.S. Appl. No. 14/964,524.

Office Action dated Oct. 4, 2016 for U.S. Appl. No. 14/719,295.

[No Author Listed], Accepta 4360 Material Safety Data Sheet. Accepta Ltd. Manchester, UK. Jul. 19, 2011. 5 pages.

[No Author Listed], Caustic Soda 50% Material Safety Data Sheet. Univar. Redmond, Washington. Apr. 8, 2013. 10 pages.

[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>.

[No Author Listed], Everything you want to know about Coagulation & Flocculation. Chapter 1: The Electrokinetic Connection. Zeta-Meter, Inc. Staunton, VA. 4th Edition. 1993:1-8.

[No Author Listed], Hi-Cal Hydrate Material Safety Data Sheet. Chemical Lime Co. Fort Worth, Texas. May 1, 2008. 6 pages.

[No Author Listed], Polyaluminum Chloride Solution Material Safety Data Sheet. GEO Specialty Chemicals, Ltd. Little Rock, Arkansas. Mar. 12, 2015. 11 pages.

(56) References Cited

OTHER PUBLICATIONS

[No Author Listed], Servco 1010 Material Safety Data Sheet. Servco Chemicals. Lubbock, Texas. Aug. 7, 2013. 4 pages.

[No Author Listed], Soda Ash Material Safety Data Sheet. Univar. Redmond, Washington. Apr. 7, 2003. 10 pages.

Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>. 2 pages.

Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015. 1 page.

Arthur et al., Technical Summary of Oil & Gas Produced Water Treatement Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.

Huang et al., The bridging force between colloidal particles in a polyelectrolyte solution. Langmuir. Nov. 27, 2012;28(47):16300-5. doi: 10.1021/1a303918p.

Khayet et al., Determination of surface and bulk pore sizes of flat-sheet and hollow-fiber membranes by atomic force microscopy, gas permeation and solute transport methods. Desalination. 2003;158:57-64.

Kwak et al., New Insights on the Role of Multivalent Ions I Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.

Li, Mineral precipitation and deposition in cooling systems using impaired waters: mechanisms, kinetics, and inhibition. Dissertation defended Jul. 27, 2010. 224 pages.

Mcginnis et al., Pilot demonstration of the NH3/CO2 forward osmosis desalination process on high salinity brines. Desalination. Mar. 2013;312:67-74. Supporting information included.

Moghadasi et al., Scale deposits in porous media and their removal by EDTA injection. ECI Symposium Series. 2007. vol. RP5. Article 10. p. 57-70.

Sahin, A Mathematical Model for Explanation of Ion Exchange of the Boric Acid Adsorption. Jour. Chem. Soc. Pak. 1998;20(1):12-8.

Sinex, EDTA—A molecule with a complex story. University of Bristol, School of Chemistry. <www.chm.bris.ac.uk/motm/edta/edtah.htm> (accessed Jan. 8, 2013). Aug. 1, 2007. 6 pages.

Office Action dated Jan. 5, 2018 for AU App. No. 2014306078 and claims pending.

Office Action dated May 19, 2017 for CN App. No. 201480054728.0 and claims pending.

Office Action dated Aug. 16, 2017 for SA App. No. 009/M/003497 and claims pending.

Office Action dated Nov. 19, 2017 for SA App. No. 009/M/003497 and claims pending.

Office Action dated Aug. 23, 2017 for U.S. Appl. No. 14/452,387 and claims pending.

Notice of Allowance dated Jan. 19, 2018 for U.S. Appl. No. 14/452,387 and claims allowed.

International Search Report and Written Opinion dated Jan. 12, 2015 for PCT App. No. PCT/US2014/049812.

International Preliminary Report on Patentability dated Jul. 30, 2015 for PCT App. No. PCT/US2014/049812.

Office Action dated Sep. 6, 2017 for CN App. No. 201480052403.9 and claims pending.

Office Action dated Oct. 11, 2017 for U.S. Appl. No. 14/943,467 and claims pending.

Govindan, Thermal Design of Humidification Dehumidification Systems for Affordable and Small-scale Desalination. Doctoral Thesis. Massachusetts Institute of Technology. Sep. 2012. 286 pages.

Jan. 5, 2018, Office Action (and claims pending).
May 19, 2017, Office Action (and claims pending).
Aug. 16, 2017, Office Action (and claims pending).
Nov. 19, 2017, Office Action (and claims pending).
Jan. 12, 2015, International Search Report and Written Opinion.
Jul. 30, 2015, International Preliminary Report on Patentability.
Sep. 6, 2017, Office Action (and claims pending).

Office Action dated Mar. 1, 2018 for CN App No. 201480052403.9 and claims pending.

Office Action dated Mar. 30, 2018 for CN App. No. 201480054728.0 and claims pending.

Office Action dated Nov. 21, 2018 for CN App. No. 201480054728.0 and claims pending.

* cited by examiner

DESALINATION SYSTEMS AND ASSOCIATED METHODS

RELATED APPLICATIONS

This application claims priority under 35 U.S.C. § 119(e) to U.S. Provisional Patent Application Ser. No. 61/881,365, filed Sep. 23, 2013, and entitled "Desalination Systems and Associated Methods"; U.S. Provisional Patent Application Ser. No. 61/988,034, filed May 2, 2014, and entitled "Desalination Systems and Associated Methods"; U.S. Provisional Patent Application Ser. No. 61/906,620, filed Nov. 20, 2013, and entitled "Water Treatment Systems and Associated Methods"; U.S. Provisional Patent Application Ser. No. 61/908,263, filed Nov. 25, 2013, and entitled "Water Treatment Systems and Associated Methods"; each of which is incorporated herein by reference in its entirety for all purposes.

TECHNICAL FIELD

Systems and methods related to the desalination of aqueous solutions containing one or more dissolved salts are generally described.

BACKGROUND

Desalination is a process by which some amount of salt and/or other minerals and one or more other components of a liquid solution are at least partially separated. For example, salt water can be desalinated to produce fresh water suitable for human consumption, irrigation, industrial use, and/or a variety of other uses. Most of the modern interest in desalination is focused on developing cost-effective ways of providing fresh water for human use.

As the world's population expands, the accompanying increase in demand for fresh water has led to fresh water shortages in many regions of the world. Desalination could potentially play a role in mitigating such shortages. Accordingly, improved desalination systems and methods are desirable.

SUMMARY

The desalination of aqueous solutions containing one or more dissolved solids, and associated systems and components, are generally described. In certain embodiments, the desalination system includes a desalination apparatus and a precipitation apparatus. Associated methods may, in certain embodiments, include the steps of forming a concentrated saline solution containing at least one dissolved salt and subsequently precipitating at least a portion of the salt from the concentrated saline solution. The subject matter of the present invention involves, in some cases, interrelated products, alternative solutions to a particular problem, and/or a plurality of different uses of one or more systems and/or articles.

In one aspect, a water desalination system is provided. The water desalination system comprises, according to certain embodiments, an ion-removal apparatus configured to receive an aqueous feed stream comprising at least one scale-forming ion and at least one dissolved monovalent salt and to remove at least a portion of the at least one scale-forming ion to produce an ion-diminished stream containing less of the scale-forming ion relative to the feed stream; a desalination apparatus fluidically connected to the ion-removal apparatus and configured to remove water from the ion-diminished stream to produce a concentrated saline stream enriched in the dissolved monovalent salt relative to the ion-diminished stream; and a precipitation apparatus fluidically connected to the desalination apparatus and configured to precipitate at least a portion of the dissolved monovalent salt from the concentrated saline stream to produce a product stream containing less of the dissolved monovalent salt relative to the concentrated saline stream.

Certain aspects relate to a method for desalinating water. In some embodiments, the method comprises removing, within an ion-removal apparatus, at least a portion of at least one scale-forming ion from an aqueous feed stream comprising the scale-forming ion and at least one dissolved monovalent salt to produce an ion-diminished stream containing less of the scale-forming ion relative to the aqueous feed stream; removing, within a desalination apparatus, water from the ion-diminished stream to produce a concentrated saline stream enriched in the dissolved monovalent salt relative to the ion-diminished stream; and precipitating, within a precipitation apparatus, at least a portion of the dissolved monovalent salt from the concentrated saline stream to produce a product stream containing less of the dissolved monovalent salt relative to the concentrated saline stream.

In certain embodiments, the method comprises removing, within a desalination apparatus, water from an aqueous feed stream comprising at least one dissolved monovalent salt to produce a concentrated saline stream enriched in the dissolved monovalent salt relative to the aqueous feed stream; and precipitating, within a precipitation apparatus, at least a portion of the dissolved monovalent salt from the concentrated saline stream to produce a product stream containing less of the dissolved monovalent salt relative to the concentrated saline stream, wherein, during operation, the concentrated saline stream exiting the desalination apparatus is below a saturation limit with respect to the monovalent salt contained within the aqueous solution.

The method comprises, according to some embodiments, removing, within a desalination apparatus, water from an aqueous feed stream comprising at least one dissolved monovalent salt to produce a concentrated saline stream enriched in the dissolved monovalent salt relative to the aqueous feed stream; precipitating, within a precipitation apparatus, at least a portion of the dissolved monovalent salt from the concentrated saline stream to produce a product stream containing less of the dissolved monovalent salt relative to the concentrated saline stream; and recycling at least a portion of the product stream to the desalination apparatus, wherein a concentration of the dissolved monovalent salt within the concentrated saline stream differs from a concentration of the dissolved monovalent salt within the aqueous feed stream by no more than about 20%.

According to certain embodiments, the method comprises removing, within a desalination apparatus, water from an aqueous feed stream comprising at least one dissolved monovalent salt to produce a concentrated saline stream enriched in the dissolved monovalent salt relative to the aqueous feed stream; and precipitating, within a precipitation apparatus, at least a portion of the dissolved monovalent salt from the concentrated saline stream to produce a product stream containing less of the dissolved monovalent salt relative to the concentrated saline stream, wherein substantially no precipitation of the dissolved monovalent salt occurs within the desalination apparatus.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
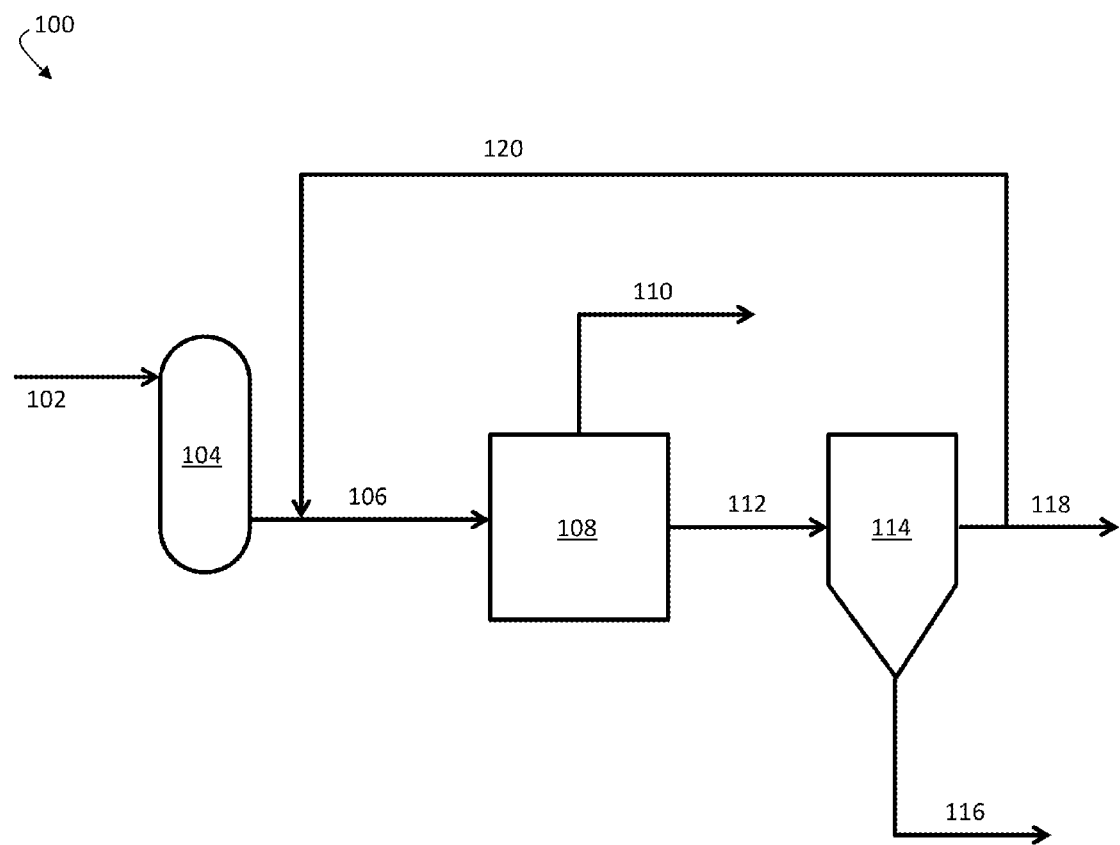
FIG. 1 is a schematic illustration of an exemplary desalination system, according to one set of embodiments.

Systems and methods related to the desalination of aqueous solutions containing one or more dissolved salts are generally described. In some embodiments, the desalination systems and methods can include removing at least a portion of water from a solution containing at least one monovalent salt within a desalination apparatus to produce a water-containing stream and a concentrated saline stream. Some such embodiments involve subsequently precipitating at least one dissolved monovalent salt from the concentrated saline stream within a precipitation apparatus. In certain embodiments, before transporting the saline solution to the desalination apparatus, an ion-removal apparatus is used to remove at least one scale-forming ion from the saline solution, which can reduce the level of scaling within unit operations downstream of the ion-removal apparatus (e.g., the desalination apparatus, the precipitation apparatus, and/or other downstream units).

Certain embodiments are related to the discovery that flow rate can impact the degree to which dissolved monovalent salts are precipitated from aqueous solutions, and that flow rates (e.g., low flow velocity) can thus be used to control the degree to which precipitation occurs within a liquid containing a dissolved salt. Accordingly, certain embodiments involve controlling the flow velocity of aqueous streams and/or the concentration of the dissolved salts and/or temperature within the desalination system to control the location and degree of salt formation and removal. For example, in certain embodiments, dissolved monovalent salt concentrations and/or flow velocities of aqueous saline streams can be selected and/or controlled such that little or no precipitation of the dissolved monovalent salt(s) occurs outside the precipitation apparatus and/or such that relatively large amounts of dissolved monovalent salt(s) are precipitated within the precipitation apparatus. In some embodiments, the control of precipitation within the system can be achieved without adding or removing material from the concentrated saline stream after it has been transported out of the desalination apparatus. In certain such embodiments, precipitation control can be achieved simply by altering the flow velocity of the saline stream within the desalination system. For example, in some embodiments, the dissolved monovalent salt may be maintained in a dissolved state by maintaining the stream containing the dissolved monovalent salt at a relatively high flow velocity. In some embodiments, the dissolved monovalent salt may be at least partially precipitated from solution by slowing or stopping the flow of the fluid containing the dissolved monovalent salt.

Some embodiments relate to the discovery that it can be advantageous to operate the desalination apparatus such that a relatively small percentage of the aqueous solution entering the desalination apparatus is recovered as water. In other words, it can be advantageous, in certain but not necessarily all embodiments, to operate the desalination apparatus such that the salt concentration within the concentrated saline solution exiting the desalination apparatus is not much higher than the salt concentration within the aqueous solution fed to the desalination apparatus. While operation in such a "low pass recovery" regime would, at first glance, appear to undesirably limit the rate at which purified water is recovered from the system, low pass recovery operation of the desalination apparatus can be useful in limiting the degree to which unwanted precipitation of the dissolved salt(s) occurs within the desalination apparatus and/or other regions of the desalination system upstream of the precipitation apparatus.

FIG. 1 is an exemplary schematic illustration of water desalination system 100, which can be used to produce a recovered water stream from an aqueous solution containing at least one dissolved salt.

In certain embodiments, the water desalination system comprises an ion-removal apparatus. Referring to FIG. 1, for example, water desalination system 100 comprises ion-removal apparatus 104. The ion-removal apparatus may be, according to certain embodiments, configured to receive an aqueous feed stream, such as feed stream 102 in FIG. 1. In some embodiments, the stream fed to the ion-removal apparatus comprises at least one scale-forming ion (e.g., a scale-forming cation and/or a scale-forming anion) and at least one dissolved monovalent salt. A dissolved salt is a salt that has been solubilized to such an extent that the component ions of the salt are no longer ionically bonded to each other. Generally, the term "monovalent salt" refers to a salt that includes a monovalent cation (i.e., a cation with a redox state of +1 when solubilized). Examples of monovalent salts include, but are not limited to, those containing sodium, potassium, lithium, rubidium, cesium, and francium. In certain embodiments, the monovalent salts include monovalent anions such as, for example, chlorine, bromine, fluorine, and iodine. Examples of monovalent salts include, but are not limited to, sodium chloride (NaCl), sodium bromide (NaBr), potassium chloride (KCl), potassium bromide (KBr), sodium carbonate ($Na_2CO_3$), sodium sulfate ($Na_2SO_4$), and the like.

Feed stream 102 can originate from a variety of sources. For example, in certain embodiments, at least a portion of the stream fed to the ion-removal apparatus comprises and/or is derived from seawater, ground water, brackish water, water from an oil or gas well, and/or the effluent of a chemical process (e.g., the effluent of another desalination system, or another chemical process).

The ion-removal apparatus is configured, in certain embodiments, to remove at least a portion of the at least one scale-forming ion to produce an ion-diminished stream containing less of the scale-forming ion relative to the stream fed to the ion-removal apparatus. For example, referring to FIG. 1, ion-removal apparatus 104 can be configured to remove at least a portion of at least one scale-forming ion within stream 102 to produce ion-diminished stream 106.

In some instances, the scale-forming ions that are removed from the aqueous feed stream using the ion-removal apparatus may be sparingly soluble (e.g., having a solubility of less than about 1 gram per 100 grams of water, less than about 0.1 grams per 100 grams of water, or less than about 0.01 grams per 100 grams of water (or lower) at 20° C.), and therefore, may be prone to scaling within various parts of the water desalination system. Examples of sparingly soluble salts containing scale-forming ions include, but are not limited to, calcium carbonate ($CaCO_3$), which has a solubility of about 0.000775 grams per 100 grams of water at 20° C.; calcium sulfate ($CaSO_4$), which has a solubility of about 0.264 grams per 100 grams of water at 20° C.; magnesium hydroxide ($Mg(OH)_2$), which has a solubility of about 0.0009628 grams per 100 grams of water at 20° C.; and barium sulfate ($BaSO_4$), which has a solubility of about 0.000285 grams per 100 grams of water at 20° C. The ion-removal apparatus can be configured, according to certain embodiments, such that removal of the scale-forming ions inhibits or prevents scaling of solid salts comprising the scale-forming ions during operation of the water desalination system.

The ion-removal apparatus can be configured to remove any scale-forming ion that is desired to be removed. Those of ordinary skill in the art are familiar with scale-forming ions, which are ions that tend to form solid scale when present in concentrations exceeding their solubility levels. Examples of scale forming ions include multivalent cations (e.g., $Mg^{2+}$, $Ca^{2+}$, $Sr^{2+}$, $Ba^{2+}$, and the like) and scale forming anions such as carbonate anions ($CO_3^{2-}$), bicarbonate anions ($HCO_3^-$), sulfate anions ($SO_4^{2-}$), bisulfate anions ($HSO_4$), dissolved silica (e.g., $SiO_2(OH)_2^{2-}$, $SiO(OH)^{3-}$, $(SiO_3^{2-})_n$, and the like), hydroxide ions (OH), and the like.

In some embodiments, the ion-removal apparatus is configured to remove at least one scale-forming cation. The scale-forming cation may be a multivalent cation, such as a bivalent cation, in some embodiments. For example, the ion-removal apparatus can be configured to remove, according to some embodiments, $Mg^+$, $Ca^{2+}$, $Sr^{2+}$, and/or $Ba^{2+}$. Other scale-forming cations may also be removed using the ion-removal apparatus, according to certain embodiments. In some embodiments, the ion-removal apparatus is configured to remove at least one scale-forming anion. Non-limiting examples of scale-forming anions the ion-removal apparatus can be configured to remove include carbonate anions ($CO_3^{2-}$), bicarbonate anions ($HCO_3$), sulfate anions ($SO_4^{2-}$), bisulfate anions ($HSO_4$), and/or dissolved silica (e.g., $SiO_2(OH)_2^{2-}$, $SiO(OH)^{3-}$, $(SiO_3^{2-})_n$, and the like). In some embodiments, the ion-removal apparatus is configured to remove one or more multivalent scale-forming anions, such as one or more bivalent scale-forming anions (e.g., carbonate anions ($CO_3^{2-}$) and/or sulfate anions ($SO_4^{2-}$)).

In certain embodiments, the ion-removal apparatus is configured to remove a relatively large percentage of the dissolved scale-forming ions from the feed stream. For example, in some embodiments, the concentration, in moles per liter (i.e., molarity), of at least one scale-forming ion within the stream exiting the ion-removal apparatus (e.g., stream 106 in FIG. 1) is at least about 50%, at least about 75%, at least about 90%, at least about 95%, or at least about 99% less than the concentration of the at least one scale-forming ion within the stream entering the ion-removal apparatus (e.g., stream 102 in FIG. 1). In certain embodiments, the sum of the concentrations, in moles per liter, of all scale-forming ions within the stream exiting the ion-removal apparatus is at least about 50%, at least about 75%, at least about 90%, at least about 95%, or at least about 99% less than the sum of the concentrations of all scale-forming ions within the stream entering the ion-removal apparatus.

According to certain embodiments, the ion-removal apparatus is configured to produce an ion-diminished stream containing scale-forming ions in an amount of less than about 50 mg/L, less than about 10 mg/L, less than about 1 mg/L, or less than about 0.1 mg/L. In some embodiments, the ion-diminished stream is substantially free of scale-forming ions.

The ion-removal apparatus may have any one of a number of suitable configurations. In some embodiments, the ion-removal apparatus comprises an ion-removal medium, which can be contained, for example, within a vessel.

In some such embodiments, the ion-removal medium comprises a composition configured to induce precipitation of the at least one scale-forming ion. In some embodiments, the composition can be configured to induce precipitation of at least one scale-forming cation. For example, when caustic soda and/or soda ash are added to a stream containing $Ca^{2+}$ and/or $Mg^{2+}$, at least a portion of $Ca^{2+}$ and/or $Mg^{2+}$ contained within the stream may be precipitated as an insoluble solid such as, for example, calcium carbonate and/or magnesium hydroxide. In some embodiments, an anionic polymer may be used as the ion-removal medium. In some embodiments, the composition can be configured to induce precipitation of at least one scale-forming anion. For example, a cationic polymer can be used as an ion-removal medium to remove scale-forming anions. Mixtures of the above-mentioned ion-removal media and/or other ion-removal media may also be used.

In certain embodiments, the ion-removal apparatus is an ion-exchange apparatus. The ion-exchange apparatus may contain, for example, an ion-exchange medium. Those of ordinary skill in the art are familiar with the function of ion-exchange media, which generally remove at least one scale-forming ion from a solution and, in some but not all cases, replace the scale-forming ion(s) with one or more monovalent ion(s). For example, in certain embodiments, the ion-exchange medium functions by contacting the aqueous solution containing the scale-forming ion(s), after which at least a portion of the scale-forming ions are captured by the ion-exchange medium and at least a portion of the monovalent ions originally contained within the ion-exchange medium are released into the aqueous solution. In some such embodiments, the ion-exchange medium comprises an ion exchange resin.

Those of ordinary skill in the art would be capable of selecting an appropriate ion-removal medium (e.g., an ion-exchange medium or other ion-removal medium) for use in the ion-removal apparatus based upon the types of scale-forming ions dissolved in the stream fed to the ion-removal apparatus, the concentration of said ions, and the flow velocity at which one desires to operate the ion-removal apparatus, among other factors.

In some embodiments, the ion-removal apparatus is an electrocoagulation apparatus. Those of ordinary skill in the art are familiar with electrocoagulation, in which short wave electrolysis can be used to remove at least a portion of multivalent ions and/or suspended contaminants.

The ion-removal apparatus can include one or more tanks and/or columns in which the ion-removal operation is performed. For example, in certain embodiments, the ion-removal apparatus comprises one or more tanks into which the aqueous feed stream and the ion-removal medium are transported. In one set of embodiments, the aqueous feed stream and a precipitation-inducing ion-removal medium are fed to a series of tanks in which precipitation of scale-forming ions is allowed to occur. In other embodiments, a column (e.g., a packed column) can be used to perform the ion-removal operation. For example, in some embodiments, the aqueous solution can be fed to one or more packed columns containing an ion-exchange resin or other ion-removal medium, which may be used to remove at least a portion of the scale-forming ion(s) from the aqueous solution. One of ordinary skill in the art, given the present disclosure, would be capable of designing a variety of other suitable configurations for performing the ion-removal steps described herein.

In one set of embodiments, the pH of the aqueous stream within the ion-removal apparatus can be adjusted to induce precipitation. For example, in some embodiments, after at least a portion of the scale-forming ions within the feed stream have been removed using an ion-removal medium, the pH of the feed stream can be altered (e.g., increased or decreased) to induce additional precipitation. In some embodiments, adjusting the pH can include adjusting the pH to be near neutral (e.g., a pH of from about 6 to about 8, a pH of from about 6.5 to about 7.5, or a pH of from about 6.9 to about 7.1). In some embodiments, the pH adjustment step is performed in a vessel that is separate from the vessel in which scale-forming ions are removed using the precipitation medium.

The ion-removal apparatus can be configured, in certain embodiments, to process water (e.g., the feed stream) at a flow rate of from about 5000 barrels per day to about 10,000 barrels per day. The embodiments described herein are not necessarily limited to these flow capacities, however, and in some embodiments, the ion-removal apparatus can be configured to process fewer than 5000 barrels of water per day or more than 10,000 barrels of water per day.

In one exemplary set of embodiments, the ion-removal apparatus is configured as follows. The ion-removal apparatus can comprise one or more optional holding tanks (e.g., equalization tanks), into which an incoming saline feed stream can be transported. In some embodiments, the saline stream is transported from the optional holding tank(s) to one or more reaction tanks, in which the saline stream can be mixed with one or more precipitation-inducing agents. For example, in certain embodiments, the saline stream is transported to a first reaction tank, in which soda ash and coagulant can be added and mixed with the saline stream. In certain embodiments, the saline stream is next transported to a second reaction tank, in which caustic soda can be added and mixed with the saline stream. In certain embodiments, the saline stream is next transported to a third reaction tank, in which one or more anionic polymers can be added and mixed with the saline stream.

In some embodiments, after the saline stream has been treated in the reaction tank, the saline stream can then be transported to a clarifier. The clarifier can be configured such that at least a portion of the precipitate formed in the reaction tank(s) settles within the clarifier. In certain embodiments, the settled precipitate within the clarifier is transported to a sludge holding tank and subsequently to a filter (e.g., a vacuum filter such as a rotary vacuum filter). The saline stream may then be transported out of the clarifier for further processing (e.g., in the desalination apparatus).

It should be noted that the ion-removal step is optional, and that certain embodiments are directed to systems and methods in which ion-removal is not performed. In some such embodiments, feed stream 102 of system 100 is transported directly to a desalination apparatus (described in more detail below), and ion-removal apparatus 104 is omitted.

The water desalination system comprises, in certain embodiments, a desalination apparatus. For example, referring to FIG. 1, water desalination system 100 comprises desalination apparatus 108. The desalination apparatus may be, in certain embodiments, fluidically connected to the ion-removal apparatus. In some such embodiments, the desalination apparatus is configured to receive at least a portion of an aqueous ion-diminished stream produced by the ion-removal apparatus. For example, referring to FIG. 1, desalination apparatus 108 is fluidically connected to ion-removal apparatus 104 and is configured to receive ion-diminished stream 106 from ion-removal apparatus 104.

In some embodiments, the desalination apparatus is directly fluidically connected to the ion-removal apparatus. For example, as illustrated in FIG. 1, desalination apparatus 108 is directly fluidically connected to ion-removal apparatus 104 via ion-diminished stream 106. Generally, a direct fluid connection exists between a first unit and a second unit (and the two units are said to be "directly fluidically connected" to each other) when they are fluidically connected to each other and the composition of the fluid entering the second unit is not substantially different from the fluid leaving the first unit (i.e., no fluid component changes in relative abundance by more than 1%). As an illustrative example, a stream that connects first and second components, and in which the fluid contents are not substantially diverted away from the stream would be said to directly fluidically connect the first and second components. If, on the other hand, a separation step and/or a chemical reaction is performed that substantially alters the composition of the stream contents during transport from the first component to the second component, the stream would not be said to directly fluidically connect the first and second components. In certain embodiments in which two units are directly fluidically connected, the phase of the fluid leaving the first unit is the same as the phase of the fluid entering the second unit.

In some embodiments, including certain embodiments in which an ion-removal apparatus is not included upstream of the desalination apparatus, the desalination apparatus is configured to receive a stream fed to system 100 (e.g., stream 102 in FIG. 1, which can have any of the properties of feed stream 102 described elsewhere herein), rather than a feed stream originating from an ion-removal apparatus.

The stream fed to the desalination apparatus contains, in certain embodiments, at least one dissolved monovalent salt. One advantage associated with certain (although not necessarily all) of the inventive systems and methods described herein is that they can be used to process streams with relatively high concentrations of dissolved monovalent salts. For example, in some embodiments, in certain embodiments, the stream fed to the desalination apparatus may contain dissolved monovalent salts in an amount of at least about 2 wt %, at least about 5 wt %, at least about 10 wt %, at least about 20 wt %, or at least about 25 wt % (and/or, in certain embodiments, up to the solubility limit).

The desalination apparatus can be configured, in some embodiments, to remove water from the feed stream (which may contain, for example, at least a portion of an ion-diminished stream from an ion-removal apparatus) to produce a concentrated saline stream enriched in the dissolved monovalent salt relative to the stream fed to the desalination apparatus. In some such embodiments, the desalination apparatus can also be configured to produce a water-containing stream that contains a lower concentration of the dissolved monovalent salt than the stream fed to the desalination apparatus. For example, referring to FIG. 1, desalination apparatus 108 is configured to receive ion-diminished stream 106 containing at least one dissolved monovalent salt from ion-removal apparatus 104 (although, as noted above, in other embodiments, desalination apparatus 108 may be configured to receive feed stream 102 (which can contain at least one dissolved monovalent salt) directly). In addition, desalination apparatus 108 is configured to produce concentrated saline stream 112, which is enriched in the dissolved monovalent salt relative to ion-diminished stream 106. Desalination apparatus 108 can also be configured to produce water-containing stream 110, which contains a lower concentration of the dissolved monovalent salt than ion-diminished stream 106.

In some embodiments, the desalination apparatus is configured to produce a stream containing water of relatively high purity. For example, in some embodiments, the desalination apparatus produces a stream (e.g., stream 110 in FIG. 1) containing water in an amount of at least about 75 wt %, at least about 85 wt %, at least about 95 wt %, at least about 99 wt %, at least about 99.9 wt %, or at least about 99.99 wt % (and/or, in certain embodiments, up to about 99.999 wt %, or more).

According to certain embodiments, the concentrated saline stream produced by the desalination apparatus (e.g., stream 112 in FIG. 1) includes dissolved salts such that the concentrated saline stream has a density of from about 9 pounds per gallon to about 11 pounds per gallon, from about 9.5 pounds per gallon to about 10.5 pounds per gallon, or from about 9.8 pounds per gallon to about 10.2 pounds per gallon at 60° F. In some embodiments, the concentrated saline stream produced by the desalination apparatus includes dissolved salts such that it has a density of about 10 pounds per gallon at 60° F.

The desalination apparatus can have any configuration suitable for producing a water-rich stream and a concentrated saline stream from an aqueous saline input stream. In certain embodiments, the desalination apparatus comprises a humidifier configured to evaporate water from the ion-diminished stream into a gaseous stream to produce the concentrated saline stream enriched in the dissolved monovalent salt relative to the ion-diminished stream. The desalination apparatus may comprise, in some embodiments, a dehumidifier fluidically connected to the humidifier and configured to condense at least a portion of the water from the gaseous stream. For example, in certain embodiments, the desalination apparatus is a humidification/dehumidification desalination apparatus.

Figure 2:
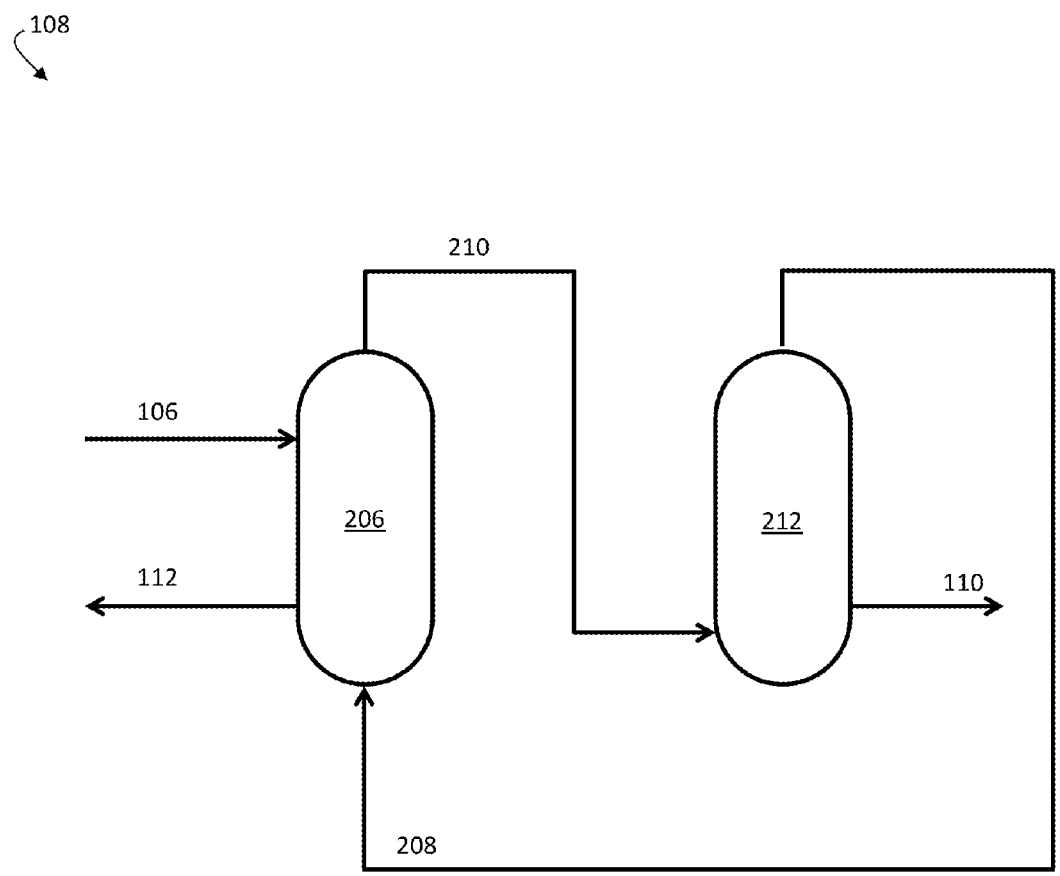
FIG. 2 is, according to certain embodiments, a schematic illustration of an exemplary desalination apparatus.

FIG. 2 is a schematic illustration of an exemplary desalination apparatus 108 which may be used in association with certain of the inventive systems and methods described herein. In FIG. 2, desalination apparatus 108 comprises humidifier 206, which can be configured to receive stream 106 (which may correspond to, for example, at least a portion of an ion-diminished stream and/or at least a portion of a stream fed directly to a water desalination system). Humidifier 206 may also be configured to receive gaseous stream 208. Gaseous stream 208 may comprise any gas capable of carrying water vapor. For example, gaseous stream 208 may comprise air, nitrogen, oxygen, a noble gas (e.g., helium, argon, etc.), and/or any other suitable gas. Humidifier 206 can be configured, in some embodiments, such that water is evaporated from stream 106 into gaseous stream 208 to produce a humidified gaseous stream 210 and a concentrated saline stream 112. Desalination apparatus 108 further comprises dehumidifier 212 fluidically connected to humidifier 206. Dehumidifier 212 can be configured to condense at least a portion of the water from gaseous stream 210 to produce a water-containing stream 110 and a dehumidified gaseous stream.

In certain embodiments, the dehumidifier is directly fluidically connected to the humidifier. For example, in FIG. 2, dehumidifier 212 is directly fluidically connected (via streams 210 and 208) to humidifier 206. In other embodiments, the humidifier and dehumidifier can be arranged such that they are fluidically connected to each other but are not directly fluidically connected to each other.

The desalination apparatus may be operated as follows. A feed stream containing at least one dissolved monovalent salt can be transported to the humidifier, according to certain embodiments. In some embodiments, water is removed from the stream fed to the desalination apparatus (e.g., an ion-diminished stream and/or another stream fed to the desalination apparatus) to produce a concentrated saline stream enriched in the dissolved monovalent salt relative to the feed stream. The concentrated saline stream can be produced, for example, by humidifying a gaseous stream. Referring to FIG. 2, for example, stream 106 containing at least one dissolved monovalent salt and gaseous stream 208 can be fed to humidifier 206. In certain embodiments, humidifying the gaseous stream comprises contacting the gaseous stream with the stream fed to the desalination unit within the humidifier to evaporate at least a portion of the water from the feed stream into the gaseous stream. For example, in FIG. 2, water from stream 106 can be evaporated into gaseous stream 208 within humidifier 206 to produce a humidified gaseous stream 210 (which can contain water vapor) and a concentrated saline stream 112. Concentrated saline stream 112 can be transported away from the desalination apparatus and to a downstream processing apparatus, such as a precipitation apparatus, described in more detail below.

Some embodiments comprise transporting the gaseous stream to a dehumidifier and condensing at least a portion of the water within the gaseous stream. For example, referring to FIG. 2, humidified gaseous stream 210 can be transported to dehumidifier 212, in which water can be condensed to form water-containing stream 110 and dehumidified gaseous stream 208. In certain embodiments, including the set of embodiments illustrated in FIG. 2, at least a portion of the dehumidified gaseous stream can be recycled to humidifier 206 (e.g., in a closed loop) and used to remove water from an aqueous solution fed to the humidifier. In other embodiments, the dehumidified stream from the dehumidifier can be transported elsewhere within the system and/or vented.

The humidifier may have any configuration that allows for the transfer of water from the desalination feed stream to the gaseous stream. In certain embodiments, the humidifier comprises a vessel (e.g., a stainless steel tank or other vessel). The humidifier vessel can comprise a first input configured to receive an aqueous saline feed stream (e.g., stream 106 in FIGS. 1 and 2) and a second input configured to receive a gaseous stream into which water from the aqueous saline feed stream is vaporized.

In some embodiments, the humidifier comprises a device configured to produce droplets of the aqueous saline stream when the aqueous saline feed stream is transported through the device. For example, a nozzle or other spraying device may be positioned at the top of the humidifier such that the aqueous feed stream is sprayed downward to the bottom of the humidifier. The use of a spraying device can increase the degree of contact between the aqueous saline stream fed to the humidifier and the gaseous stream into which water from the aqueous saline stream is transported. In some such embodiments, the gaseous stream can be transported in a counter-current direction, relative to the direction along which the aqueous saline stream is transported. For example, the gaseous stream may be transported into the bottom of the humidifier, through the humidifier vessel, and out of the top of the humidifier. In certain embodiments, the remaining portion of water that is not transported from the aqueous saline feed stream to the gaseous stream is collected at or near the bottom of the humidifier and transported out of the humidifier (and out of the desalination system) as a concentrated saline stream (e.g., stream 112 in FIGS. 1 and 2).

In certain embodiments, humidifier 206, stream 106, and/or stream 208 may be heated before and/or during the humidification step. Heating one or more of these streams may increase the degree to which water is transferred from the aqueous saline feed stream to the gaseous stream within the humidifier.

In some embodiments, humidifier 206 contains a packing material (e.g., polyvinyl chloride (PVC) packing material or other similar materials). The packing can facilitate turbulent gas flow and/or enhanced direct contact between the aqueous saline stream and the gaseous stream within the humidifier.

The humidifier may be of any size, which will generally depend upon the number of humidifier units employed in the system and the total flow rate of aqueous saline solution that is to be desalinated. In certain embodiments, the total of the volumes of the humidifiers used in the desalination system can be at least about 1 liter, at least about 10 liters, or at least about 100 liters (and/or, in some embodiments, up to about 1,000,000 liters, or more).

The dehumidifier may have any configuration that allows for the condensation of water from the vapor-containing gaseous stream fed to the dehumidifier. In certain embodiments, the dehumidifier comprises a vessel (e.g., a stainless steel tank or other vessel). The dehumidifier vessel can comprise a first input configured to receive a water-vapor-containing gaseous feed stream (e.g., stream 210 in FIG. 2). The dehumidifier vessel can comprise a first outlet configured to output a dehumidified gaseous stream (e.g., stream 208 in FIG. 2) and a second outlet configured to output a water-containing stream containing a relatively high percentage of water (e.g., stream 110 in FIGS. 1 and 2).

In certain embodiments, the dehumidifier is configured such that the gaseous stream directly contacts a liquid within the dehumidifier. Configuring the dehumidifier such that direct contact between the gaseous stream and condensed liquid is maintained within the dehumidifier can be, in some embodiments, advantageous, as heat transfer to the gaseous phase may be enhanced in some such embodiments, leading to more energy efficient condensation of the water vapor from the gaseous phase.

In certain embodiments, the dehumidifier comprises a bubble column condenser. Referring to FIG. 2, for example, humidified gaseous stream 210 from humidification apparatus 206 may be transported to the bottom of dehumidifier 212, after which, the contents of stream 210 may be contacted with a condensed liquid at the bottom of dehumidifier 212. As the contents of humidified gaseous stream 210 are transported through the liquid within dehumidifier 212, at least a portion of the water vapor may be condensed and held at the bottom of the dehumidifier. Condensed water at the bottom of the dehumidifier may be transported out of the dehumidifier via stream 110, and dehumidified gas may be transported out of the top of dehumidifier via stream 208.

The dehumidifier can comprise a single stage in which liquid and vapor-containing gas are contacted or multiple stages on which liquid and vapor-containing gas are contacted. Each stage of the bubble-column condenser may comprise a bubble generator, such as a sieve plate, at the bottom of the stage. During operation, the condensed liquid may collect above the bubble generator, and the humidified gaseous stream may be bubbled through the condensed liquid by passing the gaseous stream through the bubble generator.

In some embodiments, the humidifier in the humidification/dehumidification desalination apparatus comprises a bubble column humidifier.

When multiple-stage bubble column condensers are employed as dehumidification apparatuses, the inlet of the first stage can be coupled to the vapor-containing gas source and the outlet of the first stage can be coupled to the inlet of the second stage. Additional stages can be arranged such that outlets of a preceding stage are fluidically coupled to inlets of a subsequent stage, and the outlet of the final stage can be used as the outlet of the condenser (e.g., from which stream 208 originates in FIG. 2).

Suitable bubble-column condensers that may be used as the dehumidification apparatus in certain systems and methods described herein include those described in U.S. Patent Publication No. 2013/0075940, by Govindan et al., filed Jul. 12, 2012 as U.S. patent application Ser. No. 13/548,166, and entitled "Bubble-Column Vapor Mixture Condenser" and a U.S. Provisional Patent Application No. 61/877,032, filed on Sep. 12, 2013 and entitled "Systems Including a Bubble Column Condenser," each of which is incorporated herein by reference in its entirety for all purposes.

The dehumidifier may be of any size, which will generally depend upon the number of dehumidifier units employed in the system and the total flow rate of aqueous saline solution that is to be desalinated. In certain embodiments, the total of the volumes of the dehumidifiers used in the desalination system can be at least about 1 liter, at least about 10 liters, or at least about 100 liters (and/or, in some embodiments, up to about 1,000,000 liters, or more).

It should be understood that the inventive systems and methods described herein are not limited to those including a humidification/dehumidification desalination apparatus, and that in other embodiments, other desalination apparatus types may be employed. For example, in some embodiments, the desalination apparatus comprises a reverse osmosis desalination system, an electrodialysis desalination system, a multistage flash desalination system, a multiple-effect desalination system, a thermal vapor compression desalination system, and/or any other suitable desalination system.

In some embodiments, the desalination apparatus can be configured to be operated such that there are substantially no regions within the desalination apparatus in which the aqueous solution is quiescent. The aqueous solution within the desalination apparatus can be kept moving, for example, by designing the flow passageways within the desalination apparatus such that the number of "dead zones" within the system are reduced or eliminated within the desalination apparatus. For example, in some embodiments, the conduits (e.g., piping) and/or the fluid flow path within the desalination apparatus can be designed without sharp bends. In some embodiments, relatively high local flow velocities (e.g., of at least 10 feet per second) can be maintained within the desalination apparatus. By keeping the aqueous solution within the desalination apparatus moving, precipitation and settling within the desalination apparatus can be reduced and/or eliminated, which can prevent clogging of the desalination apparatus and/or other parts of the desalination system.

In some embodiments, the water desalination system comprises a precipitation apparatus. Referring back to the exemplary embodiment of FIG. 1, desalination system 100 comprises precipitation apparatus 114. The precipitation apparatus may be, in certain embodiments, fluidically connected to the desalination apparatus. In some such embodiments, the precipitation apparatus is configured to receive at least a portion of a concentrated saline stream output by the desalination apparatus. For example, in FIG. 1, precipitation apparatus 114 is fluidically connected to desalination apparatus 108 and configured to receive concentrated saline stream 112 from desalination apparatus 108.

The precipitation apparatus is, in certain embodiments, configured to precipitate at least a portion of the dissolved monovalent salt from the concentrated saline stream to produce a product stream containing less of the dissolved monovalent salt relative to the concentrated saline stream. For example, in FIG. 1, precipitation apparatus 114 is can be configured such that at least a portion of the dissolved monovalent salt within concentrated saline stream 112 precipitates within precipitation apparatus 114 to produce water-containing product stream 118, which contains less dissolved monovalent salt than concentrated saline stream 112.

The precipitation apparatus can be manufactured in any suitable manner. In certain embodiments, the precipitation apparatus comprises a vessel, such as a crystallization tank or a settling tank. The vessel may include an inlet through which at least a portion of the concentrated saline stream produced by the desalination apparatus is transported into the precipitation vessel. The precipitation vessel may also include at least one outlet. For example, the precipitation vessel may include an outlet through which the water containing stream (containing the dissolved monovalent salt in an amount that is less than that contained in the inlet stream) is transported. In some embodiments, the precipitation vessel includes an outlet through which solid, precipitated salt is transported.

In some embodiments, the crystallization tank or the settling tank comprises a low shear mixer. The low shear mixer can be configured to keep the crystals that are formed mixed (e.g., homogeneously mixed) in the brine stream. According to certain embodiments, the vessel is sized such that there is sufficient residence time for crystals to form and grow. In certain embodiments, the precipitation apparatus comprises a vessel which provides at least 20 minutes of residence time for the concentrated saline stream. As one non-limiting example, the vessel comprises, according to certain embodiments, a 6000 gallon vessel, which can be used to provide 24 minutes of residence in a 500 US barrel per day fresh water production system.

Those of ordinary skill in the art are capable of determining the residence time of a volume of fluid in a vessel. For a batch (i.e., non-flow) system, the residence time corresponds to the amount of time the fluid spends in the vessel. For a flow-based system, the residence time is determined by dividing the volume of the vessel by the volumetric flow rate of the fluid through the vessel.

In some embodiments the crystallization tank or settling tank is followed by a storage tank. The storage tank may have, in some embodiments, a capacity that is substantially the same as the capacity of the crystallization tank or settling tank. In certain embodiments, the crystallization or settling tank and/or the storage tank can be configured to accommodate batch operation of the downstream solid handling apparatus, which can be fluidically coupled to the precipitation apparatus.

In some embodiments, the precipitation apparatus comprises at least one vessel comprising a volume within which the concentrated saline stream is substantially quiescent. In some embodiments, the flow velocity of the fluid within the substantially quiescent volume is less than the flow velocity at which precipitation (e.g., crystallization) is inhibited. For example, the fluid within the substantially quiescent volume may have, in certain embodiments, a flow velocity of zero. In some embodiments, the fluid within the substantially quiescent volume may have a flow velocity that is sufficiently high to suspend the formed solids (e.g., crystals), but not sufficiently high to prevent solid formation (e.g., crystal nucleation). The substantially quiescent volume within the vessel may occupy, in some embodiments, at least about 1%, at least about 5%, at least about 10%, or at least about 25% of the volume of the vessel. As one particular example, the precipitation apparatus can comprise a vessel including a stagnation zone. The stagnation zone may be positioned, for example, at the bottom of the precipitation vessel. In certain embodiments, the precipitation apparatus can include a second vessel in which the solids precipitated in the first vessel are allowed to settle. For example, an aqueous stream containing the precipitated solids can be transported to a settling tank, where the solids can be allowed to settle. The remaining contents of the aqueous stream can be transported out of the settling tank. While the use of two vessels within the precipitation apparatus has been described, it should be understood that, in other embodiments, a single vessel, or more than two vessels may be employed. In certain embodiments, the desalination system can be operated such that precipitation of the salt occurs substantially only within the stagnation zone of the precipitation vessel.

In certain embodiments, the precipitation apparatus is directly fluidically connected to the desalination apparatus. For example in FIG. 1, precipitation apparatus 114 is directly fluidically connected to desalination apparatus 108 via concentrated saline stream 112. It should be understood, however, that the invention is not limited to embodiments in which the precipitation apparatus and the desalination apparatus are directly fluidically connected, and in other embodiments, the precipitation apparatus and the desalination apparatus are fluidically connected but are not directly fluidically connected.

In some embodiments, the precipitated salt from the precipitation apparatus is fed to a solids-handling apparatus. The solids-handling apparatus may be configured, in certain embodiments, to remove at least a portion of the water retained by the precipitated monovalent salt. In some such embodiments, the solids-handling apparatus is configured to produce a cake comprising at least a portion of the precipitated monovalent salt from the precipitation apparatus. As one example, the solids-handling apparatus can comprise a filter (e.g., a vacuum drum filter or a filter press) configured to at least partially separate the precipitated salt from the remainder of a suspension containing the precipitated salt. In some such embodiments, at least a portion of the liquid within the salt suspension can be transported through the filter, leaving behind solid precipitated salt. As one non-limiting example, a Larox FP 2016-8000 64/64 M40 PP/PP Filter (Outotech, Inc.) may be used as the filter. The filter may comprise, in certain embodiments, a conveyor filter belt which filters the salt from a suspension containing the salt.

In some embodiments, the desalination system comprises a transport device configured to transport precipitated monovalent salt away from the precipitation apparatus. For example, in certain embodiments, a pump is used to transport a suspension of the precipitated monovalent salt away from the precipitation apparatus. In other embodiments, a conveyor could be used to transport precipitated salt away from the precipitation apparatus. In certain embodiments, the transport device is configured to transport the precipitated monovalent salt from the precipitation apparatus to a solids-handling apparatus.

In some embodiments, the desalination system can be configured such that at least a portion of the product stream from the precipitation apparatus is recycled to the ion-removal apparatus and/or the desalination apparatus, as described in more detail below.

Various embodiments of the desalination system may be operated as described below.

In embodiments in which ion-removal is present, the operation of the desalination system may comprise removing, within the ion-removal apparatus, at least a portion of at least one scale-forming ion from a stream fed to the ion-removal apparatus to produce an ion-diminished stream containing less of the scale-forming ion relative to the stream fed to the ion-removal apparatus. For example, referring to FIG. 1, aqueous stream 102 can be fed to ion-removal apparatus 104, and at least a portion of at least one scale-forming ion within feed stream 102 can be removed to produce ion-diminished stream 106 containing less of the scale-forming ion relative to feed stream 102.

Some embodiments comprise removing, within a desalination apparatus, water from an aqueous stream containing at least one dissolved monovalent salt (e.g., from an ion-removal effluent stream or from a source other than an ion-removal effluent stream) to produce a concentrated saline stream enriched in the dissolved monovalent salt relative to the stream fed to the desalination apparatus. For example, referring to FIG. 1, ion-diminished stream 106 can be transported to desalination apparatus 108, in which water from ion-diminished stream 106 is removed to produce concentrated saline stream 112. Operation of the desalination apparatus may also produce a water-containing stream that contains less dissolved monovalent salt than is present within the stream fed to the desalination apparatus. For example, in FIG. 1, removing water from ion-diminished stream 106 can produce water-containing stream 110.

Certain embodiments comprise precipitating, within a precipitation apparatus, at least a portion of the dissolved monovalent salt from the concentrated saline stream to produce a product stream containing less of the dissolved monovalent salt relative to the concentrated saline stream. For example, referring to FIG. 1, in certain embodiments, concentrated saline stream 112 can be transported to precipitation apparatus 114. At least a portion of the dissolved monovalent salt within concentrated saline stream 112 can be precipitated within precipitation apparatus 114 to produce a product stream 118 containing less of the dissolved monovalent salt relative to concentrated saline stream 112.

As noted above, certain embodiments are related to the discovery that flow velocity of the aqueous saline stream can impact the degree to which dissolved monovalent salts are precipitated, and thus, flow velocity can be used to control the degree to which precipitation occurs. Accordingly, certain embodiments involve controlling the flow velocity of aqueous streams containing dissolved salts within the desalination system to control the location and degree of salt formation and removal. For example, in certain embodiments, precipitating at least a portion of the dissolved monovalent salt from the concentrated saline stream comprises reducing the flow velocity of (e.g., substantially stopping the flow of) the concentrated saline stream (e.g., within the precipitation apparatus). Furthermore, in some such embodiments, precipitation of a salt within the precipitation apparatus can be commenced without adding or removing material from the precipitation apparatus and/or without adding or removing material from the concentrated saline stream after it has been transported out of the desalination apparatus. This can be achieved, for example, by altering flow velocity to control the saturation level of the aqueous saline solution, as described in more detail below.

In some embodiments, precipitating at least a portion of the dissolved monovalent salt from the concentrated saline stream comprises adjusting (e.g., increasing or reducing) the temperature of the concentrated saline stream. In some such embodiments, the temperature of the concentrated saline stream is adjusted until the solubility of the dissolved monovalent salt is reduced below the concentration of the dissolved monovalent salt. In some such embodiments, precipitating at least a portion of the dissolved monovalent salt from the concentrated saline stream comprises adjusting the temperature of the concentrated saline stream by at least about 1° C., at least about 2° C., at least about 5° C., at least about 10° C., or more. As one non-limiting example, the solubility of sodium sulfate varies substantially with changes in temperature. For example, the solubility of sodium sulfate at 10° C. is about 10 g/100 g of water, whereas the solubility of sodium sulfate at 30° C. is about 50 g/100 g of water. Accordingly, in some embodiments, one can precipitate sodium sulfate from a concentrated saline stream by reducing the temperature of the concentrated saline stream containing the dissolved sodium sulfate (e.g., from any first temperature within the range of 0° C. to 80°

C. to any second temperature within the range of 0° C. to 80° C. that is lower than the first temperature).

In certain embodiments, after salt has been precipitated within the precipitation apparatus, a stream containing precipitated monovalent salt can be transported from the precipitation apparatus. In FIG. 1, for example, precipitated salt can be transported from precipitation apparatus 114 via stream 116.

Certain embodiments comprise recycling a flow of at least a portion of the product stream from the precipitation apparatus to the desalination apparatus. For example, referring to FIG. 1, portion 120 of product stream 118 is recycled to ion-diminished stream 106 such that portion 120 is fed to desalination apparatus 108. In certain embodiments, portion 120 can be recycled to ion-removal apparatus 104 in addition to, or in place of recycling portion 120 to the desalination apparatus. In some instances, recycling at least a portion of the product stream to the ion-removal apparatus and/or the desalination apparatus can increase the recovery ratio of the desalination system. That is to say, recycling at least a portion of the product stream to the ion-removal apparatus and/or the desalination apparatus can increase the percentage of the water within the feed stream that is recovered by the desalination system as desalinated water, thereby producing more of the desalinated water-containing stream from the desalination apparatus. In certain embodiments, all or substantially all of product stream 118 from the precipitation apparatus can be recycled to ion-removal apparatus 104 and/or desalination apparatus 108.

In some embodiments, the water desalination systems and methods can be configured and operated, respectively, substantially continuously. Generally, a water desalination system is said to be operated substantially continuously when an aqueous stream is being fed to the desalination system at the same time that a desalinated product stream is being produced by the desalination system. In certain embodiments, the water desalination systems described herein can be configured to be operated continuously for at least about 6 hours, at least about 24 hours, or at least about 1 week (and/or up to about 1 month, or longer). That is to say, in certain embodiments, the water desalination systems described herein can be configured to simultaneously take in saline water and produce desalinated production stream over a period of at least about 6 hours, at least about 24 hours, or at least about 1 week (and/or up to about 1 month, or longer).

In certain embodiments, the systems and methods described herein can be configured and operated such that substantially no precipitation of the dissolved monovalent salt occurs within the desalination apparatus. In some such embodiments, the systems and methods described herein can be configured and operated such that substantially no precipitation of the dissolved monovalent salt occurs outside the precipitation apparatus. Avoiding precipitation of solid salt within the desalination apparatus and within other areas of the water desalination system outside the precipitation apparatus can reduce or eliminate a variety of problems associated with unwanted solid precipitation, including clogging of flow channels, reduced heat transfer, reduced mass transfer, and the like.

In some embodiments, the desalination system can be configured and/or operated such that the solution within the desalination apparatus and/or other parts of the desalination system upstream of the precipitation apparatus is below the saturation limit with respect to the monovalent salt(s) contained within the aqueous solution. The saturation limit of an aqueous saline solution, as used herein, refers to the bulk concentration of monovalent salts in the aqueous saline solution at which 0.5 wt % of the aqueous solution is made up of monovalent solid salt. The above-defined saturation limit is typical at or near the bulk concentration of monovalent salts in the aqueous saline solution at which there is inception of crystal formation. One can determine whether a given solution is at its saturation limit with respect to the monovalent salt(s) contained within the aqueous solution by inspecting the solution to determine whether the formation of solid monovalent salt(s) is occurring.

Generally, the saturation limit of an aqueous saline solution will depend upon the temperature, pressure, and flow velocity of the saline solution. For example, saline aqueous solutions at relatively high temperatures will have higher solubility limits than saline aqueous solutions at relatively low temperatures. As another example, saline aqueous solutions at relatively high flow velocities will have higher solubility limits than saline aqueous solutions at relatively low flow velocities.

Without wishing to be bound by any particular theory, it is believed that operation of the desalination apparatus and/or other units upstream of the precipitation apparatus below the saturation level can inhibit (and, in certain instances, prevent) the precipitation of dissolved monovalent salt(s) within the desalination apparatus, within the ion-removal apparatus (when present), and/or within any other components of the system upstream of the precipitation apparatus. Avoiding precipitation in such areas may reduce or prevent clogging of the system, enhance mass transfer, and/or enhance heat transfer.

In certain embodiments, during operation, the concentrated saline stream exiting the desalination apparatus is below the saturation limit with respect to the monovalent salt(s) contained within the aqueous solution. In some embodiments, the concentrated saline stream is below the saturation limit with respect to the monovalent salt(s) contained within the aqueous solution at substantially all points between the desalination apparatus and the precipitation apparatus.

Certain aqueous saline solutions may be sufficiently dilute that the addition of relatively large amounts of salt may be necessary to reach the saturation limit. For example, in certain embodiments, the bulk concentration of at least one of the dissolved monovalent salts within the concentrated saline stream exiting the desalination apparatus can be increased by at least about 2%, at least about 5%, or at least about 10% without reaching the saturation limit at the exit of the desalination apparatus. In certain embodiments, the bulk concentration of at least one of the dissolved monovalent salts within the concentrated saline stream can be increased by at least about 2%, at least about 5%, or at least about 10% without reaching the saturation limit at any point between the desalination apparatus and the precipitation apparatus.

The desalination system can be configured and/or operated, in some embodiments, such that the solution within the precipitation apparatus is well above the saturation limit with respect to the monovalent salt(s) contained within the aqueous solution. Generally, such operation is evidenced by the precipitation of a relatively large amount of monovalent salt within the precipitation apparatus. Without wishing to be bound by any particular theory, operating the desalination system in this manner can provide for more efficient precipitation of solid within the precipitation apparatus, relative to precipitation of solid near the saturation limit, which can be difficult to achieve in certain cases.

In some embodiments, during operation, at least about 2 wt %, at least about 5 wt %, at least about 10 wt %, or at least about 15 wt % (and/or, in certain embodiments, up to about 30 wt % or more) of the concentrated saline stream that enters the precipitation apparatus is precipitated as a solid salt in the precipitation apparatus. In alternative embodiments, during operation, at least about 1 wt % of the concentrated saline stream that enters the precipitation apparatus is precipitated as a solid salt in the precipitation apparatus.

According to certain embodiments, the transition between operation below the saturation limit at points upstream of the precipitation apparatus (e.g., at the exit of the desalination apparatus) and operation above the saturation limit within the precipitation apparatus can be achieved without substantially adding or removing material from the aqueous solution. For example, in some embodiments, the transition between operation below the saturation limit at points upstream of the precipitation apparatus and operation above the saturation limit within the precipitation apparatus can be achieved simply by adjusting the flow velocity of the aqueous saline solution. When the aqueous solution is traveling relatively fast (e.g., at the exit of the desalination apparatus), the solution can be in a sub-saturation state. However, when the flow of the aqueous solution is slowed (or stopped) within the precipitation apparatus, the solution may become saturated or supersaturated (e.g., to any of the degrees mentioned elsewhere herein) such that precipitation of at least one monovalent salt occurs.

In certain embodiments, the desalination apparatus can be configured to remove a relatively small amount of water from the stream fed to the desalination apparatus. Such operation can be particularly advantageous (although is not required) in certain embodiments in which the recovery of water from relatively highly-concentrated system input streams is desired (e.g., systems in which water is recovered from brackish water streams, concentrated saline solutions from other desalination systems, etc.). By removing a relatively small amount of water from the stream fed to the desalination apparatus, one can ensure, according to certain embodiments, that the concentration of the dissolved monovalent salt(s) within the aqueous streams upstream of the precipitation apparatus does not exceed saturation, thereby inhibiting (or preventing) the precipitation of solids within the desalination apparatus, the ion-removal apparatus (if present), and/or any other components upstream of the precipitation apparatus.

Accordingly, in some embodiments, a concentration of the dissolved monovalent salt within the concentrated saline stream differs from a concentration of the dissolved monovalent salt within the stream fed to the desalination apparatus by no more than about 20%, no more than about 10%, or no more than about 5% (and/or, in certain embodiments, by as little as 1%, or less). This can be calculated, for example, by comparing the concentration of the dissolved monovalent salt within the concentrated saline stream directly fluidically connected to the precipitation apparatus (e.g., stream 112 in FIG. 1) to the concentration of the dissolved monovalent salt within the stream fed to the desalination apparatus that is directly fluidically connected to the precipitation apparatus (e.g., stream 106 in FIG. 1). For example, referring to desalination apparatus 108 in FIG. 2, in some embodiments, the concentration of dissolved monovalent salt within concentrated saline stream 112 is no more than about 20% less (or no more than about 10% less, or no more than about 5% less) than the concentration of the dissolved monovalent salt within stream 106 fed to desalination apparatus 108.

Certain of the systems described herein can be configured to desalinate saline solutions entering at relatively high flow rates, and accordingly, can be configured to produce relative pure water streams at relatively high flow rates. For example, in some embodiments, the systems and methods described herein may be operated to receive an aqueous saline feed stream (e.g., stream 102 in FIG. 1 and/or stream 106 in FIGS. 1 and 2) at a flow rate of at least about 1 gallon/minute, at least about 10 gallons/minute, at least about 100 gallons/minute, or at least about 1000 gallons/minute (and/or, in certain embodiments, up to about 10,000 gallons/minute, or more).

In certain embodiments, the components of the desalination system (e.g., optional ion-removal apparatus 104, desalination apparatus 108, and/or precipitation apparatus 114) can be modular or otherwise able to be disconnected from (and, in certain embodiments, reconnected to) each other. In addition, sub-components of certain of the operations described herein can be modular or otherwise able to be disconnected from (and, in certain embodiments, reconnected to) each other. For example, humidifier 206 and dehumidifier 212 in FIG. 2 can be, in certain embodiments, modular or otherwise able to be disconnected from (and, in certain embodiments, reconnected to) each other. As one non-limiting example, while humidifier 206 and dehumidifier 212 are illustrated as including single vessels in FIG. 2, it should be understood that, in other embodiments, the humidifier and/or the dehumidifier may include more than one vessel (e.g., the humidifier may include two or more vessels fluidically connected in parallel and/or the dehumidifier may include two or more vessels fluidically connected in parallel). Serial connections are also possible. In some embodiments, the humidifier and/or the dehumidifier may be modular, such that one or more vessels may be disconnected and/or replaced while maintaining operation of the remaining vessel(s). In some embodiments, one or more modular apparatus (e.g., one or more ion-removal module, one or more desalination module, and/or one or more precipitation module) is configured to process from about 500 barrels to about 1000 barrels of water per day.

In addition, it should be understood that, in embodiments in which a single unit is shown in the figures and/or is described as performing a certain function, the single unit could be replaced with multiple units (e.g., operated in parallel) performing a similar function. For example, in certain embodiments, optional ion-removal apparatus 104, desalination apparatus 108, and/or precipitation apparatus 114 could correspond to a plurality of ion-removal apparatuses, a plurality of desalination apparatuses, and/or a plurality of precipitation apparatuses (e.g., configured to be operated in parallel).

Figure 4A:
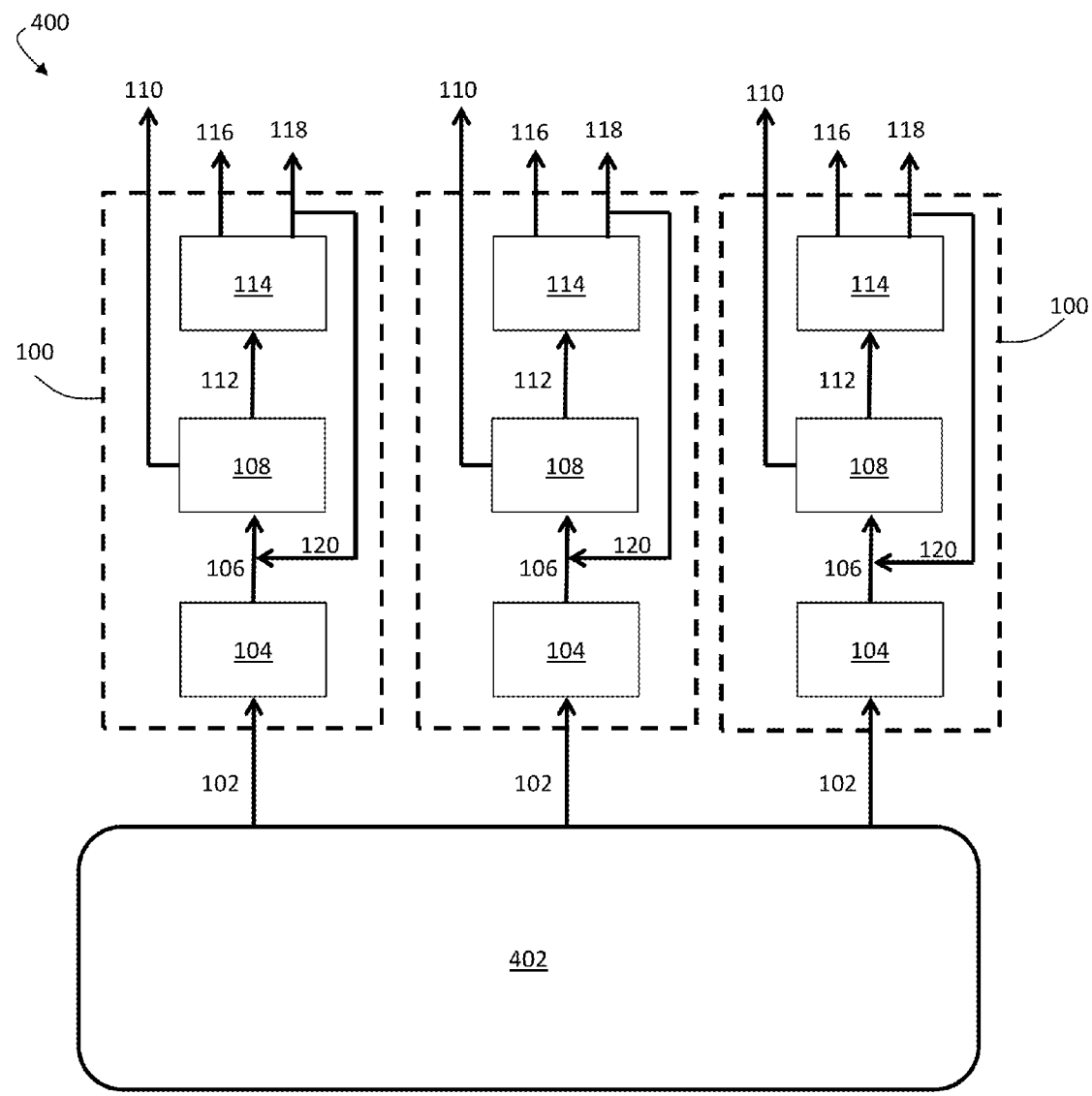
FIG. 4A is a schematic cross-sectional illustration of a desalination process comprising multiple modular desalination systems, according to one set of embodiments.

In certain embodiments, the desalination system itself (which can include, for example, optional ion-removal apparatus 104, desalination apparatus 108, and/or precipitation apparatus 114) can be modular. For example, FIG. 4A is a schematic illustration of desalination process 400 in which modular desalination systems 100 are configured to receive water from saline water source 402. Saline water source 402 can include any of the saline water sources described elsewhere herein. For example, saline water source 402 can comprise and/or be derived from seawater, ground water, brackish water, water from an oil or gas well, and/or the effluent of a chemical process (e.g., the effluent of another desalination system, or another chemical process).

In FIG. 4A, each of modular desalination systems 100 includes ion-removal apparatus 104, desalination apparatus 108, and precipitation apparatus 114. However, other configurations are also possible, including any of the desalination system configurations described elsewhere herein. In the exemplary embodiment of FIG. 4A, saline water from source 402 is transported into each modular desalination system 100 via streams 102. Each desalination system 100 is configured to produce water-containing stream 110, which contains less dissolved monovalent salt than feed stream 102.

Figure 4B:
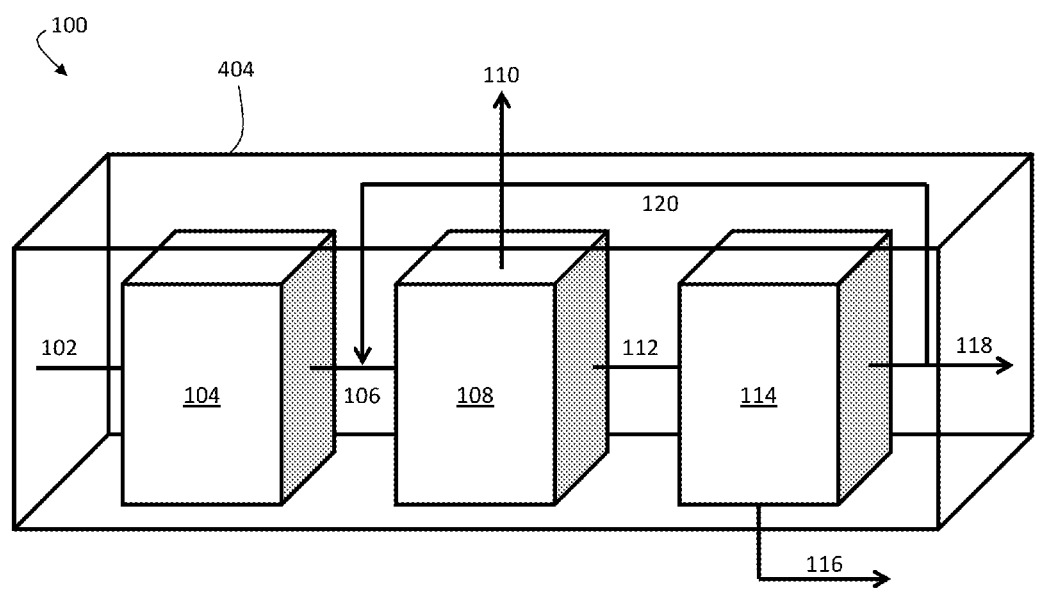
FIG. 4B is, according to certain embodiments, a schematic perspective view illustration of a modular desalination system.

In some embodiments, the modular desalination system(s) can be contained within a container. For example, in the embodiment illustrated in FIG. 4B, ion-removal apparatus 104, desalination apparatus 108, and precipitation apparatus 114 of desalination system 100 are each contained within container 404. In some embodiments, the modular desalination system can be configured to be stored, transported, assembled, disassembled, or otherwise manipulated in its modular or containerized form. The container within which the modular desalination system is arranged can be closed (with the exception of fluid conduits entering and leaving the desalination system) or open. In some embodiments, the modular desalination system can be contained within an open frame structure. In certain embodiments, the modular desalination system can be contained within a vessel having one or more walls. In certain embodiments, the modular desalination system can be contained within a standard shipping container, such as a standard 40 foot ISO shipping container, having a 40-foot length, an 8.5-foot width, and a 9.5-foot height.

Figure 4C:
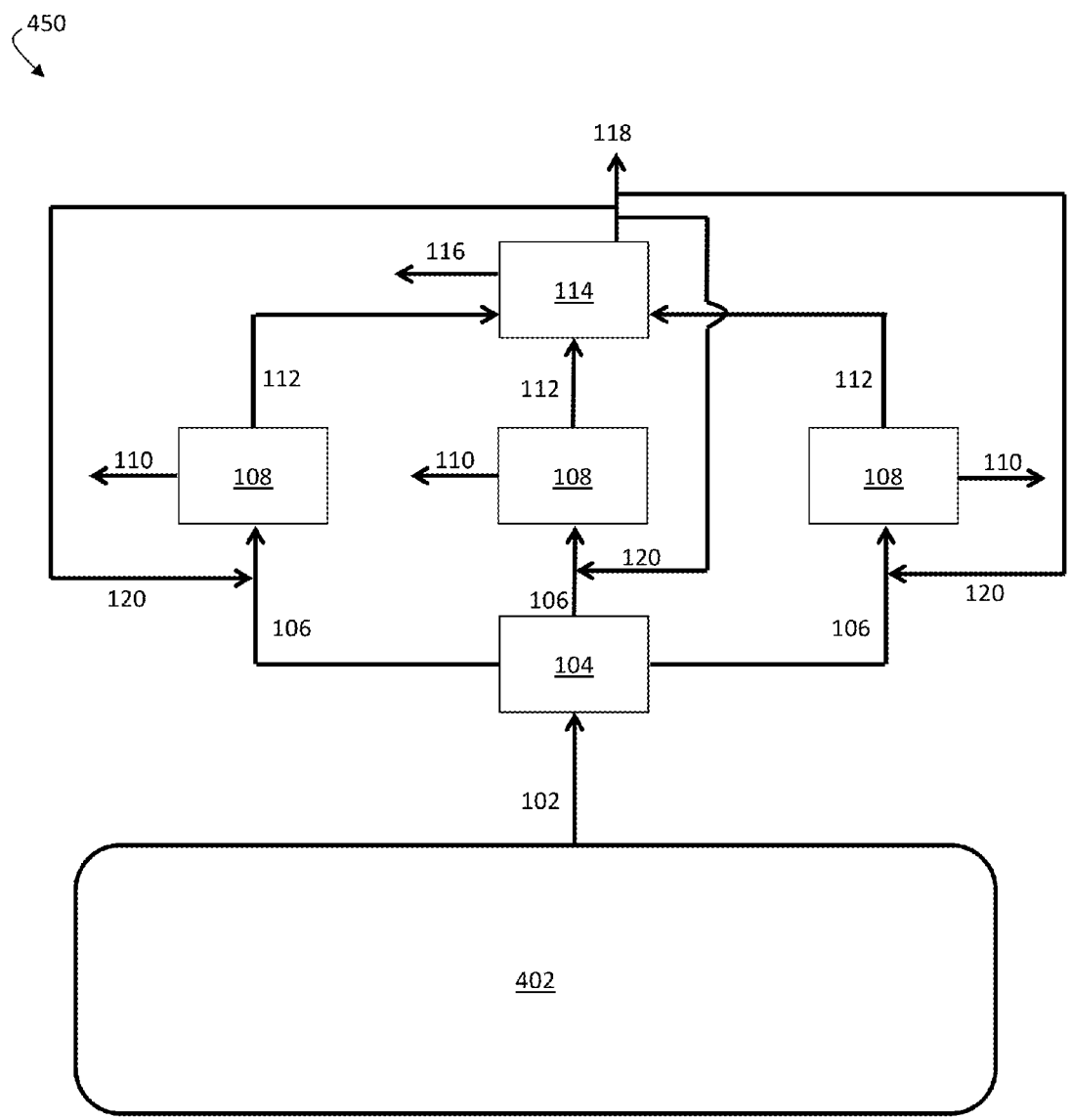
FIG. 4C is a schematic cross-sectional illustration of a desalination process comprising multiple modular desalination apparatuses, according to certain embodiments.

In certain embodiments, the desalination apparatus itself (which can include, for example, humidifier 206 and dehumidifier 212) can be modular. For example, FIG. 4C is a schematic illustration of desalination process 450 including multiple modular desalination apparatuses 108. In FIG. 4C, each of modular desalination apparatuses 108 receives an ion-diminished stream 106 from ion-removal apparatus 104. However, other configurations are also possible. For example, in some embodiments, ion-removal apparatus 104 is not present, and desalination apparatuses 108 can receive aqueous saline streams directly from source 402.

Desalination apparatuses 108 can be configured to produce water-containing product streams 110. Desalination apparatuses 108 can also be configured to produce concentrated saline streams 112, which can be transported to a precipitation apparatus 114. While a single precipitation apparatus is illustrated in FIG. 4C, multiple precipitation apparatuses could also be used. As described elsewhere herein, precipitated salt can be transported from precipitation apparatus 114 via stream 116. Precipitation apparatus 114 can also produce a water-containing product stream 118, which contains less dissolved monovalent salt than concentrated saline streams 112. Portions (or all) of water-containing product stream 118 can be recycled back to the ion-removal apparatuses and/or the desalination apparatuses (e.g., via streams 120).

Figure 4D:
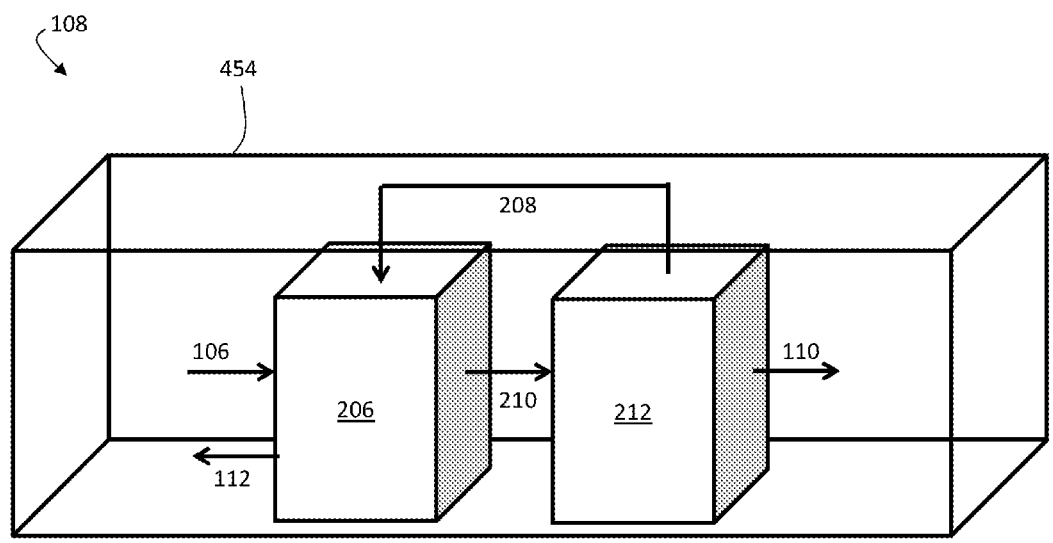
FIG. 4D is, according to certain embodiments, a schematic perspective view illustration of a modular desalination apparatus.

In some embodiments, the modular desalination apparatus(es) can be contained within a container. For example, in the embodiment illustrated in FIG. 4D, humidifier 206 and dehumidifier 212 of desalination apparatus 108 are each contained within container 454. In some embodiments, the modular desalination apparatus can be configured to be stored, transported, assembled, disassembled, or otherwise manipulated in its modular or containerized form. The container within which the modular desalination apparatus is arranged can be closed (with the exception of fluid conduits entering and leaving the desalination apparatus) or open. In some embodiments, the modular desalination apparatus can be contained within an open frame structure. In certain embodiments, the modular desalination apparatus can be contained within a vessel having one or more walls. In certain embodiments, the modular desalination apparatus can be contained within a standard shipping container, such as a standard 40 foot high cube ISO shipping container, having a 40-foot length, an 8.5 foot width, and a 9.5 foot height.

In some embodiments, a desalination process can be scaled up (and/or down) by increasing (and/or decreasing, respectively) the number of modular desalination systems that are employed in the desalination process. For example, in one set of embodiments, a first modular desalination system may be configured to process 500 barrels of water per day. In some such embodiments, the capacity of the process may be increased to 1000 barrels of water per day by incorporating an additional modular desalination system. Referring to FIG. 4A, for example, the capacity of system 400 may be increased by adding additional modular desalination systems 100, and the capacity of system 400 may be reduced by removing one or more desalination system 100. In certain embodiments, a modular desalination system may be started and/or stopped while maintaining the operation of the remaining modular desalination systems.

The modular desalination systems may be, in some embodiments, fluidically connected to a common source of saline fluid (e.g., seawater, ground water, brackish water, the effluent of a chemical process, etc.). For example, in FIG. 4A, each of modular desalination systems 100 is fluidically connected to source 404. In some embodiments, the modular desalination systems are fluidically connected to separate sources of saline fluid. The modular desalination systems within a desalination process can be configured to discharge fresh water into a common reservoir or into separate reservoirs.

The presence of suspended solids, oils, scale-forming ions, and other contaminants can complicate and impede the operation of desalination systems. In certain embodiments of the water desalination systems and methods described herein, devices can be used to pre-treat an aqueous stream that is subsequently transported to a desalination apparatus and/or post-treat an aqueous stream that has been produced by a desalination apparatus. In some embodiments, the water desalination system comprises a separator configured to remove at least a portion of a suspended and/or emulsified immiscible phase from an aqueous input stream to produce an immiscible phase-diminished stream. For example, the separator may be used to remove oil, grease, and/or other immiscible phases before the aqueous stream is transported to downstream unit operations. In certain embodiments, the water desalination system comprises a suspended solids removal apparatus configured to remove at least a portion of suspended solids from an aqueous stream. In some embodiments, the water desalination system comprises an ion-removal apparatus (e.g., as described above and elsewhere herein) configured to remove at least a portion of at least one scale-forming ion from an aqueous stream. The water desalination system comprises, in some embodiments, a volatile organic material (VOM) removal apparatus configured to remove at least a portion of VOM from an aqueous stream. According to some embodiments, the water desalination system comprises a pH reduction apparatus, which can be configured to reduce the pH of an aqueous input stream in order to inhibit scale-forming ions from precipitating outside the ion-removal apparatus.

Figure 5:
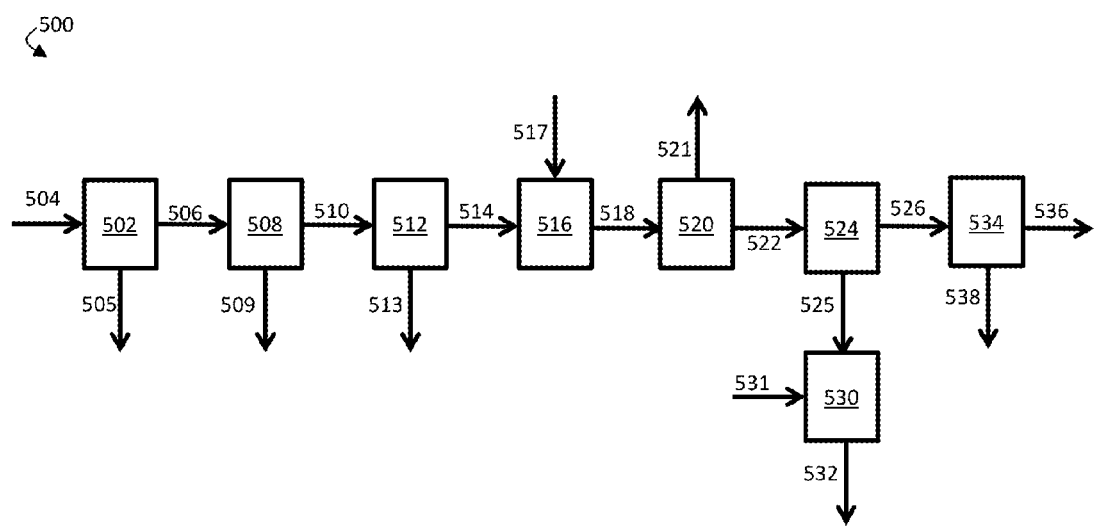
FIG. 5 is a schematic illustration of an exemplary water treatment system, according to certain embodiments.

FIG. 5 is a schematic diagram of an exemplary water desalination system 500, in which one or more of a number of components can be used to treat an aqueous stream containing at least one dissolved salt. Various of these components are described in detail below.

In some embodiments, the water desalination system comprises an optional separator configured to receive an aqueous input stream comprising a suspended and/or emulsified immiscible phase. The separator can be configured to remove at least a portion of the suspended and/or emulsified immiscible phase from an input stream received by the separator to produce an immiscible-phase-diminished stream. Generally, the immiscible-phase-diminished stream contains less of the suspended and/or emulsified immiscible phase than is present in the stream fed to the separator. According to certain embodiments, the two fluids are immiscible such that one is not soluble in the other to a level of more than 10% by weight at the temperature and under the conditions at which the emulsion is processed in the separator.

Referring to FIG. 5, water desalination system 500 comprises optional separator 502 configured to receive aqueous input stream 504 comprising a suspended and/or emulsified immiscible phase. Optional separator 502 can be configured to remove at least a portion of the suspended and/or emulsified immiscible phase to produce immiscible phase diminished stream 506, which contains less of the suspended and/or emulsified immiscible phase than stream 504. The separator can also produce a stream that is enriched in the suspended and/or emulsified immiscible phase relative to the stream fed to the separator. For example, in FIG. 5, separator 502 can be configured to produce stream 505, which is enriched in the suspended and/or emulsified water-immiscible phase relative to stream 504.

The separator can be configured to remove a variety of suspended and/or emulsified water-immiscible materials from the aqueous stream input to the separator. In some embodiments, the immiscible phase comprises oil and/or grease. It should be noted that the term "oil" merely refers to a fluid that is generally more hydrophobic than water and is not miscible or soluble in water, as is known in the art. Thus, the oil may be a hydrocarbon in some embodiments, but in other embodiments, the oil may comprise other hydrophobic fluids.

In certain embodiments, the separator is configured to remove a relatively large percentage of the water-immiscible materials from the stream fed to the separator. For example, in some embodiments, the amount (in weight percentage, wt %) of at least one water-immiscible material within the stream exiting the separator (e.g., stream 506 in FIG. 5) is at least about 50%, at least about 75%, at least about 90%, at least about 95%, or at least about 99% less than the amount of the at least one water-immiscible material within the stream entering the separator (e.g., stream 504 in FIG. 5). To illustrate, if the stream exiting the separator contains 5 wt % water-immiscible material, and the stream entering the separator contains 50 wt % water-immiscible material, then the stream exiting the separator contains 90% less water-immiscible than the stream entering the separator. In certain embodiments, the sum of the amounts of all water-immiscible materials within the stream exiting the separator is at least about 50%, at least about 75%, at least about 90%, at least about 95%, or at least about 99% less than the sum of the amounts of all water-immiscible materials within the stream entering the separator.

The separator may be fluidically connected to one or more other unit operations of the water desalination system, either directly or indirectly. In certain embodiments, the separator is fluidically connected to a desalination apparatus, described in more detail below. Referring to FIG. 5, for example, separator 502 is fluidically connected to desalination apparatus 524, described in more detail below, via streams 506, 510, 514, 518, and 522. The separator may also be, in certain embodiments, fluidically connected to an optional suspended solids removal apparatus. For example, in FIG. 5, separator 502 is fluidically connected to optional suspended solids removal apparatus 508, described in more detail below, via stream 506. In some embodiments, the separator may be fluidically connected to an optional ion-removal apparatus. For example, in FIG. 5, separator 502 is fluidically connected to optional ion-removal apparatus 512, described in more detail below, via streams 506 and 510. In certain embodiments, the separator may be fluidically connected to an optional pH reduction apparatus. For example, in FIG. 5, separator 502 is fluidically connected to optional pH reduction apparatus 516, described in more detail below, via streams 506, 510, and 514. The separator may be, in some embodiments, fluidically connected to an optional VOM removal apparatus. For example, in FIG. 5, separator 502 is fluidically connected to optional VOM removal apparatus 520, described in more detail below, via streams 506, 510, 514, and 518.

In some embodiments, the separator is directly fluidically connected to a suspended solids removal apparatus. For example, in FIG. 5, separator 502 is directly fluidically connected to suspended solids removal apparatus 508, described in more detail below, via stream 506. In certain embodiments, the separator can be configured to remove suspended solids. In some such embodiments, the separator can be configured to perform any of the functions described herein with respect to the suspended solids removal apparatus. For example, in some such embodiments, the separator can be configured to remove dirt, precipitated salts, organic solids, and/or any other suspended solid material. In some embodiments, the separator can be configured to remove at least about 50%, at least about 75%, at least about 90%, at least about 95%, or at least about 99% of the suspended solids within the stream that is transported to the separator.

It should be understood that the invention is not so limited, and in some embodiments, the separator can be directly fluidically connected to one or more other unit operations. In some embodiments, the separator is directly fluidically connected to an ion-removal apparatus, described in more detail below. In certain embodiments, the separator is directly fluidically connected to a pH reduction apparatus, described in more detail below. According to some embodiments, the separator is directly fluidically connected to a VOM removal apparatus, described in more detail below. In some embodiments, the separator is directly fluidically connected to a desalination apparatus, described in more detail below.

A variety of types of separators may be used in the embodiments described herein. In some embodiments, the separator at least partially separate the immiscible phase from the aqueous stream via gravity, centrifugal force, adsorption, and/or using a barrier.

In some embodiments, the separator comprises a hydrocyclone, such as a de-oiling hydrocyclone. In some embodiments, the hydrocyclone can be configured to remove droplets of the immiscible phase having a diameter of greater than about 10 micrometers.

In certain embodiments, the separator comprises a corrugated plate interceptor. In some embodiments, the corrugated plate interceptor can be configured to remove droplets of the immiscible phase having a diameter of greater than about 50 micrometers.

In some embodiments, the separator comprises an adsorption media filter. The adsorption media filter can contain an adsorption medium. The adsorption medium may comprise, for example, walnut shells. In some embodiments, the adsorption media filter can be configured to remove droplets of the immiscible phase having a diameter of greater than about 150 micrometers.

The separator comprises, according to certain embodiments, a coalescing media filter. The coalescing media filter can be configured, in some embodiments, to remove droplets of the immiscible phase having a diameter of less than about 2 micrometers.

In some embodiments, the separator comprises a membrane filter. In certain embodiments, the membrane filter can be configured to remove droplets of the immiscible phase having a diameter of less than about 1 micrometer.

In certain embodiments, the separator comprises a settling zone in which water and the immiscible phase are at least partially physically separated. The settling zone may comprise, for example, a settling tank. As one example, the separator may comprise, according to certain embodiments, an American Petroleum Institute separator, commonly referred to as API separators. In some embodiments, the API separator can be configured to remove droplets of the immiscible phase having a diameter of greater than about 150 micrometers.

According to some embodiments, the separator comprises a skimmer. In some embodiments, the separator comprises a dissolved gas floatation (DGF) apparatus. In certain embodiments, the separator comprises an induced gas flotation (IGF) apparatus. In some embodiments, the DGF and/or IGF apparatus can be configured to remove droplets of the immiscible phase having a diameter of greater than about 20 micrometers.

In some embodiments, the water desalination systems described herein can comprise an optional suspended solids removal apparatus. The suspended solids removal apparatus can be configured, according to certain embodiments, to remove at least a portion of suspended solids from an input stream received by the suspended solids removal apparatus to produce a suspended-solids-diminished stream. Generally, the suspended solids diminished stream contains a smaller quantity of suspended solids than the input stream received by the suspended solids removal apparatus. In FIG. 5, for example, suspended solids removal apparatus 508 can be configured to remove at least a portion of suspended solids from input stream 506 to produce a suspended solids diminished stream 510. The suspended solids removal apparatus can also produce a stream that is enriched in the suspended solids relative to the stream fed to the suspended solids removal apparatus. For example, in FIG. 5, suspended solids removal apparatus 508 can be configured to produce stream 509, which is enriched in the suspended solids relative to stream 506.

The suspended solids removal apparatus can be configured to remove any suspended solids that may be present in the stream fed to the suspended solids removal apparatus. According to certain embodiments, the suspended solids removal apparatus can be configured to remove particles that remain in suspension in water as a colloid or due to the motion of the water. In some embodiments, the suspended solids removal apparatus can be configured to remove dirt, precipitated salts, organic solids (e.g., pathogens such as bacteria, Giardia, and the like), and/or any other solid material. In some embodiments, the suspended solids that are removed by the suspended solids removal apparatus comprise particulate solids.

In certain embodiments, the suspended solids removal apparatus is configured to remove a relatively large percentage of the suspended solids from the stream fed to the suspended solids removal apparatus. For example, in some embodiments, the amount (in weight percentage, wt %) of at least one suspended solid material within the stream exiting the suspended solids removal apparatus (e.g., stream 510 in FIG. 5) is at least about 50%, at least about 75%, at least about 90%, at least about 95%, or at least about 99% less than the amount of the at least one suspended solid material within the stream entering the suspended solids removal apparatus (e.g., stream 506 in FIG. 5). In certain embodiments, the sum of the amounts of all suspended solid materials within the stream exiting the suspended solids removal apparatus is at least about 50%, at least about 75%, at least about 90%, at least about 95%, or at least about 99% less than the sum of the amounts of all suspended solid materials within the stream entering the suspended solids removal apparatus.

The suspended solids removal apparatus may be fluidically connected to one or more other unit operations of the water desalination system, either directly or indirectly. In certain embodiments, the suspended solids removal apparatus is fluidically connected to a desalination apparatus, described in more detail below. Referring to FIG. 5, for example, suspended solids removal apparatus 508 is fluidically connected to desalination apparatus 524, described in more detail below, via streams 510, 514, 518, and 522. The suspended solids removal apparatus may also be, in certain embodiments, fluidically connected to an optional separator. For example, in FIG. 5, suspended solids removal apparatus 508 is fluidically connected to optional separator 502 via stream 506. In some embodiments, the suspended solids removal apparatus may be fluidically connected to an optional ion-removal apparatus. For example, in FIG. 5, suspended solids removal apparatus 508 is fluidically connected to optional ion-removal apparatus 512, described in more detail below, via stream 510. In certain embodiments, the suspended solids removal apparatus may be fluidically connected to an optional pH reduction apparatus. For example, in FIG. 5, suspended solids removal apparatus 508 is fluidically connected to optional pH reduction apparatus 516, described in more detail below, via streams 510 and 514. The suspended solids removal apparatus may be, in some embodiments, fluidically connected to an optional VOM removal apparatus. For example, in FIG. 5, suspended solids removal apparatus 508 is fluidically connected to optional VOM removal apparatus 520, described in more detail below, via streams 510, 514, and 518.

In some embodiments, the suspended solids removal apparatus is directly fluidically connected to a separator. For example, in FIG. 5, suspended solids removal apparatus 508 is directly fluidically connected to separator 502 via stream 506. In certain embodiments, the suspended solids removal apparatus is directly fluidically connected to an ion-removal apparatus. For example, in FIG. 5, suspended solids removal apparatus 508 is directly fluidically connected to ion-removal apparatus 512, described in more detail below, via stream 510. In some embodiments, the suspended solids removal apparatus can be directly fluidically connected to one or more other unit operations. In some embodiments, the suspended solids removal apparatus is directly fluidically connected to a pH reduction apparatus, described in more detail below. According to some embodiments, the suspended solids removal apparatus is directly fluidically connected to a VOM removal apparatus, described in more detail below. In some embodiments, the suspended solids removal apparatus is directly fluidically connected to a desalination apparatus, described in more detail below.

In some embodiments, the VOM removal apparatus does not include any sources of thermal energy. For example, according to certain embodiments, the VOM removal apparatus does not include any steam input streams.

According to some embodiments, the VOM removal apparatus is configured to remove at least a portion of VOM from at least partially desalinated water (e.g., from stream 525 in FIG. 5). For example, in some embodiments, the input stream received by the VOM removal apparatus comprises at least a portion of a water-containing stream produced by the desalination apparatus that contains a lower concentration of the dissolved salt than the stream received by the desalination apparatus.

A variety of types of suspended solids removal apparatuses may be used in the embodiments described herein. In some embodiments, the suspended solids removal apparatus comprises a filter, a gravity settler, and/or a coagulant induced flocculator. In some embodiments, the coagulant induced flocculator contains a ferric chloride and/or an alum coagulant. The filter may comprise, for example, a bag filter and/or a media filter. The media filter may, according to some embodiments, comprise a diatomaceous earth medium.

According to certain embodiments, the water desalination system can comprise an optional ion-removal apparatus. The ion-removal apparatus can have any of the properties described elsewhere herein, and can be operated as described elsewhere herein. As described elsewhere, the ion-removal apparatus can be configured to remove at least a portion of at least one scale forming ion from an input stream received by the ion-removal apparatus to produce an ion-diminished stream. The ion-diminished stream can contain less of the scale-forming ion (e.g., a scale-forming cation and/or a scale-forming anion) relative to the input stream received by the ion-removal apparatus. The use of the ion-removal apparatus to remove scale-forming ions can reduce the level of scaling within unit operations downstream of the ion-removal apparatus.

For example, referring to FIG. 5, system 500 comprises optional ion-removal apparatus 512. According to certain embodiments, ion-removal apparatus 512 can correspond to ion-removal apparatus 104 in FIG. 1. In some embodiments, ion-removal apparatus 512 can have any of the properties of ion-removal apparatus 104 described above, and/or can be operated in any manner similar to the operation of ion-removal apparatus 104 described above. Ion-removal apparatus 512 can be configured, according to certain embodiments, to remove at least a portion of at least one scale-forming ion from stream 510 received by ion-removal apparatus 512. Ion-removal apparatus 512 can be configured to produce ion-diminished stream 514, which contains less of the scale-forming ion relative to input stream 510 received by ion-removal apparatus 512. The ion-removal apparatus can also produce a stream that is enriched in the scale-forming ion relative to the stream fed to the ion-removal apparatus. For example, in FIG. 5, ion-removal apparatus 512 can be configured to produce stream 513, which is enriched in at least one scale-forming ion relative to stream 510.

In certain embodiments, the ion-removal apparatus removes at least a portion of at least one scale-forming ion while allowing a dissolved monovalent salt to remain dissolved in the aqueous stream transported out of the ion-removal apparatus.

The ion-removal apparatus can be configured to remove any scale-forming ion that is desired to be removed, as described above and elsewhere herein. In addition, the ion-removal apparatus can be configured to remove scale-forming ions in any of the amounts described above and elsewhere herein.

The ion-removal apparatus may be fluidically connected to one or more other unit operations of the water desalination system, either directly or indirectly. In certain embodiments, the ion-removal apparatus is fluidically connected to a desalination apparatus, described in more detail below. Referring to FIG. 5, for example, ion-removal apparatus 512 is fluidically connected to desalination apparatus 524, described in more detail below, via streams 514, 518, and 522. The ion-removal apparatus may also be, in certain embodiments, fluidically connected to an optional separator. For example, in FIG. 5, ion-removal apparatus 512 is fluidically connected to optional separator 502 via streams 506 and 510. In some embodiments, the ion-removal apparatus may be fluidically connected to an optional suspended solids removal apparatus. For example, in FIG. 5, ion-removal apparatus 512 is fluidically connected to suspended solids removal apparatus 508 via stream 510. In certain embodiments, the ion-removal apparatus may be fluidically connected to an optional pH reduction apparatus. For example, in FIG. 5, ion-removal apparatus 512 is fluidically connected to optional pH reduction apparatus 516, described in more detail below, via stream 514. The ion-removal apparatus may be, in some embodiments, fluidically connected to an optional VOM removal apparatus. For example, in FIG. 5, ion-removal apparatus 512 is fluidically connected to optional VOM removal apparatus 520, described in more detail below, via streams 514 and 518.

In some embodiments, the ion-removal apparatus is directly fluidically connected to a suspended solids removal apparatus. For example, in FIG. 5, ion-removal apparatus 512 is directly fluidically connected to suspended solids removal apparatus 508 via stream 510. In certain embodiments, the ion-removal apparatus is directly fluidically connected to a pH reduction apparatus. For example, in FIG. 5, ion-removal apparatus 512 is directly fluidically connected to pH reduction apparatus 516, described in more detail below, via stream 514. In some embodiments, the ion-removal apparatus can be directly fluidically connected to one or more other unit operations. In some embodiments, the ion-removal apparatus is directly fluidically connected to a separator. In some embodiments, the ion-removal apparatus is directly fluidically connected to a VOM removal apparatus, described in more detail below. In some embodiments, the ion-removal apparatus is directly fluidically connected to a desalination apparatus, described in more detail below.

As described above and elsewhere herein, a variety of types of ion-removal apparatuses may be used in the embodiments described herein. Any of the types of ion-removal apparatuses described above and elsewhere herein may be used in ion removal apparatus 512 in FIG. 5.

In certain embodiments, the water desalination system can comprise a pH reduction apparatus configured to receive an aqueous input stream comprising scale forming ions and to reduce the pH of the aqueous input stream. In certain embodiments, reducing the pH of the aqueous input stream can be performed in order to inhibit scale forming ions from precipitating outside the ion-removal apparatus. For example, referring back to FIG. 5, system 500 includes optional pH reduction apparatus 516 which can be configured to receive aqueous input stream 514, which can comprise scale forming ions. pH reduction apparatus 516 can be configured to reduce the pH of aqueous input stream 514 in order to inhibit the scale forming ions from precipitating. This can result in the production of a pH reduced stream 518. In some embodiments, the pH-reduced stream has a pH of from about 6 to about 8, from about 6.5 to about 7.5, from about 6.8 to about 7.2, or from about 6.9 to about 7.1. In some embodiments, the pH-reduced stream has a pH of about 7. The pH of input stream 514 can be reduced, for example, by adding chemicals via stream 517, according to some embodiments. For example, an acidic composition can be added to the pH reduction apparatus to reduce the pH of stream 514, in certain embodiments.

The pH reduction apparatus may be fluidically connected to one or more other unit operations of the water desalination system, either directly or indirectly. In certain embodiments, the pH reduction apparatus is fluidically connected to a desalination apparatus, described in more detail below. Referring to FIG. 5, for example, pH reduction apparatus 516 is fluidically connected to desalination apparatus 524, described in more detail below, via streams 518 and 522. The pH reduction apparatus may also be, in certain embodiments, fluidically connected to an optional separator. For example, in FIG. 5, pH reduction apparatus 516 is fluidically connected to optional separator 502 via streams 506, 510, and 514. In some embodiments, the pH reduction apparatus may be fluidically connected to an optional suspended solids removal apparatus. For example, in FIG. 5, pH reduction apparatus 516 is fluidically connected to suspended solids removal apparatus 508 via stream 510 and 514. The pH reduction apparatus may be, in some embodiments, fluidically connected to an optional ion-removal apparatus. For example, in FIG. 5, pH reduction apparatus 516 is fluidically connected to optional ion-removal apparatus 512 via stream 514. In certain embodiments, the pH reduction apparatus may be fluidically connected to a VOM removal apparatus, described in more detail below. For example, in FIG. 5, pH reduction apparatus 516 is fluidically connected to optional VOM removal apparatus 520, described in more detail below, via stream 518.

In some embodiments, the pH reduction apparatus can be directly fluidically connected to an ion-removal apparatus. For example, in FIG. 5, pH reduction apparatus 516 is directly fluidically connected to ion-removal apparatus 512 via stream 514. In certain embodiments, the pH reduction apparatus is directly fluidically connected to VOM removal apparatus. For example, in FIG. 5, pH reduction apparatus 516 is directly fluidically connected to VOM removal apparatus 520, described in more detail below, via stream 518. In some embodiments, the pH reduction apparatus can be directly fluidically connected to one or more other unit operations. In some embodiments, the pH reduction apparatus is directly fluidically connected to a separator. In some embodiments, the pH reduction apparatus is directly fluidically connected to a suspended solids removal apparatus. In some embodiments, the pH reduction apparatus is directly fluidically connected to a desalination apparatus, described in more detail below.

In certain embodiments, the water desalination system comprises an optional volatile organic material (VOM) removal apparatus. The VOM removal apparatus can be configured to remove at least a portion of VOM from an input stream received by the VOM removal apparatus to produce a VOM-diminished stream. Generally, the VOM-diminished stream contains VOM in an amount that is less that the amount of VOM in the input stream received by the VOM removal apparatus.

The term "volatile organic material" or "VOM" is used herein to describe organic materials that at least partially evaporate at 25° C. and 1 atmosphere. In certain embodiments, the volatile organic material has a boiling point of less than or equal to 450° C. at 1 atmosphere. Volatile organic material includes volatile organic compounds (VOCs) and semi-volatile organic compounds (SVOCs). Examples of VOCs that can be at least partially removed by the VOM removal apparatus include, but are not limited to, acetone; 1,1,1,2-tetrachloroethane; 1,1,1-trichloroethane; 1,1,2,2-tetrachloroethane; 1,1,2-trichloroethane; 1,1-dichloroethane; 1,1-dichloroethene; 1,1-dichloropropene; 1,2,3-trichlorobenzene; 1,2,3-trichloropropane; 1,2,4-trichlorobenzene; 1,2,4-trimethylbenzene; 1,2-dibromo-3-chloropropane; 1,2-dibromoethane; 1,2-dichlorobenzene; 1,2-dichloroethane; 1,2-dichloropropane; 1,3,5-trimethylbenzene; 1,3-dichlorobenzene; 1,3-dichloropropane; 1,4-dichlorobenzene; 2,2-dichloropropane; 2-butanone; 2-chloroethyl vinyl ether; 2-chlorotoluene; 2-hexanone; 4-chlorotoluene; 4-methyl-2-pentanone; benzene; bromobenzene; bromochloromethane; bromodichloromethane; bromoform; carbon disulfide; carbon tetrachloride; chlorobenzene; chloroethane; chloroform; cis-1,2-dichloroethene; cis-1,3-dichloropropene; dibromochloromethane; dibromomethane; dichlorodifluoromethane; ethylbenzene; hexachlorobutadiene; isopropylbenzene; m-xylenes; p-xylenes; bromomethane; chloromethane; methylene chloride; n-butylbenzene; n-propylbenzene; naphthalene; o-xylene; p-Isopropyltoluene; sec-butylbenzene; styrene; tert-butylbenzene; tetrachloroethene; toluene; trans-1,2-dichloroethene; trans-1,3-dichloropropene; trichloroethene; trichlorofluoromethane; vinyl acetate; and vinyl chloride. Examples of SVOCs that can be at least partially removed by the VOM removal apparatus include, but are not limited to, 2,4,5-trichlorophenol; 2,4,6-trichlorophenol; 2,4-dichlorophenol; 2,4-dimethylphenol; 2,4-dinitrophenol; 2,4-dinitrotoluene; 2,6-dinitrotoluene; 2-chloronaphthalene; 2-chlorophenol; 2-methylnaphthalene; 2-methylphenol; 2-nitroaniline; 2-nitrophenol; 3,3'-dichlorobenzidine; 3-nitroaniline; 4,6-dinitro-2-methylphenol; 4-bromophenyl phenyl ether; 4-chloro-3-methylphenol; 4-chloroaniline; 4-chlorophenyl phenyl ether; 3 & 4-methylphenol; 4-nitroaniline; 4-nitrophenol; acenaphthene; acenaphthylene; anthracene; benzo(a)anthracene; benzo(a)pyrene; benzo(b)fluoranthene; benzo(g,h,i) perylene; benzo(k)fluoranthene; benzoic acid; benzyl alcohol; bis(2-chloroethoxy)methane; bis(2-chloroethyl)ether; bis(2-chloroisopropyl)ether; bis(2-ethylhexyl)phthalate; butyl benzyl phthalate; chrysene; di-n-butyl phthalate; di-n-octyl phthalate; dibenz(a,h)anthracene; dibenzofuran; diethyl phthalate; dimethyl phthalate; fluoranthene; fluorene; hexachlorobenzene; hexachlorocyclopentadiene; hexachloroethane; indeno(1,2,3-cd)pyrene; isophorone; n-nitroso-di-n-propylamine; n-nitrosodiphenylamine; nitrobenzene; pentachlorophenol; phenanthrene; phenol; and pyrene.

Referring back to FIG. 5, system 500 comprises optional VOM removal apparatus 520. VOM removal apparatus 520 can be configured to remove at least a portion of VOM from input stream 518 received by VOM removal apparatus 520 to produce a VOM-diminished stream 522, which contains less of the VOM relative to input stream 518 received by VOM removal apparatus 520. The VOM removal apparatus can also produce a stream that is enriched in VOM relative to the stream fed to the VOM removal apparatus. For example, in FIG. 5, VOM removal apparatus 520 can be configured to produce stream 521, which is enriched in VOM relative to stream 518.

In certain embodiments, the VOM removal apparatus is configured to remove a relatively large percentage of the VOM from the stream fed to the VOM removal apparatus. For example, in some embodiments, the amount (in weight percentage, wt %) of at least one VOM within the stream exiting the VOM removal apparatus (e.g., stream 522 in FIG. 5) is at least about 50%, at least about 75%, at least about 90%, at least about 95%, or at least about 99% less than the amount of the at least one VOM within the stream entering the VOM removal apparatus (e.g., stream 518 in FIG. 5). In certain embodiments, the sum of the amounts of all VOM within the stream exiting the VOM removal apparatus is at least about 50%, at least about 75%, at least about 90%, at least about 95%, or at least about 99% less than the sum of the amounts of all VOM within the stream entering the VOM removal apparatus.

The VOM removal apparatus may be fluidically connected to one or more other unit operations of the water desalination system, either directly or indirectly. In certain embodiments, the VOM removal apparatus is fluidically connected to a desalination apparatus, described in more detail below. Referring to FIG. 5, for example, VOM removal apparatus 520 is fluidically connected to desalination apparatus 524, described in more detail below, via stream 522. The VOM removal apparatus may also be, in certain embodiments, fluidically connected to an optional separator. For example, in FIG. 5, VOM removal apparatus 520 is fluidically connected to optional separator 502 via streams 506, 510, 514, and 518. In some embodiments, the VOM removal apparatus may be fluidically connected to an optional suspended solids removal apparatus. For example, in FIG. 5, VOM removal apparatus 520 is fluidically connected to suspended solids removal apparatus 508 via stream 510, 514, and 518. The VOM removal apparatus may be, in some embodiments, fluidically connected to an optional ion-removal apparatus. For example, in FIG. 5, VOM removal apparatus 520 is fluidically connected to optional ion-removal apparatus 512 via streams 514 and 518. In certain embodiments, the VOM removal apparatus may be fluidically connected to an optional pH reduction apparatus. For example, in FIG. 5, VOM removal apparatus 520 is fluidically connected to optional pH reduction apparatus 516 via stream 518.

In some embodiments, the VOM removal apparatus can be directly fluidically connected to a pH reduction apparatus. For example, in FIG. 5, VOM removal apparatus 520 is directly fluidically connected to pH reduction apparatus 516 via stream 518. In certain embodiments, the VOM removal apparatus is directly fluidically connected to a desalination apparatus. For example, in FIG. 5, VOM removal apparatus 520 is directly fluidically connected to desalination apparatus 524, described in more detail below, via stream 522. In some embodiments, the VOM removal apparatus can be directly fluidically connected to one or more other unit operations. In some embodiments, the VOM removal apparatus is directly fluidically connected to a separator. In some embodiments, the VOM removal apparatus is directly fluidically connected to a suspended solids removal apparatus. In some embodiments, the VOM removal apparatus is directly fluidically connected to an ion-removal apparatus.

A variety of types of VOM removal apparatuses may be used in the embodiments described herein. In some embodiments, the VOM removal apparatus comprises a carbon bed filter and/or an air stripper. In some embodiments, the air stripper comprises a packed bed stripper, a low-profile air stripper, and/or an aeration stripper. In certain embodiments, the carbon bed comprises activated carbon.

In some embodiments, the water desalination system comprises a desalination apparatus. As described above and elsewhere herein, the desalination apparatus can be configured to remove water from an aqueous stream received by the desalination apparatus to produce a concentrated saline stream enriched in a dissolved salt (e.g., enriched in a dissolved monovalent salt) relative to the aqueous stream received by the desalination apparatus. For example, in FIG. 5, system 500 comprises desalination apparatus 524, which is configured to remove water from aqueous stream 522 received by desalination apparatus 524 to produce a concentrated saline stream 526 enriched in a dissolved salt relative to aqueous stream 522 received by desalination apparatus 524. In some embodiments, the desalination apparatus can also produce a water-containing stream that contains a lower concentration of the dissolved salt (e.g., dissolved monovalent salt) than the stream fed to the desalination apparatus. For example, in FIG. 5, desalination apparatus 524 can be configured to produce water-containing stream 525, which contains less of a dissolved salt (e.g., less of a dissolved monovalent salt) than stream 522 fed to desalination apparatus 524.

Desalination apparatus 524 can have any of the features of desalination apparatuses described elsewhere herein and/or can be operated in a similar fashion as any of the desalination apparatuses described elsewhere herein. For example, in some embodiments, desalination apparatus 524 can correspond to desalination apparatus 108 in FIGS. 1 and 2. In some embodiments, the desalination apparatus is a humidification/dehumidification desalination apparatus.

The desalination apparatus may be fluidically connected to one or more other unit operations of the water desalination system, either directly or indirectly. In certain embodiments, the desalination apparatus is fluidically connected to an optional separator. For example, in FIG. 5, desalination apparatus 524 is fluidically connected to separator 502 via streams 506, 510, 514, 518, and 522. In certain embodiments, the desalination apparatus is fluidically connected to an optional suspended solids removal apparatus. For example, in FIG. 5, desalination apparatus 524 is fluidically connected to suspended solids removal apparatus 508 via streams 510, 514, 518, and 522. In certain embodiments, the desalination apparatus is fluidically connected to an optional ion-removal apparatus. For example, in FIG. 5, desalination apparatus 524 is fluidically connected to ion-removal apparatus 512 via streams 514, 518, and 522. In certain embodiments, the desalination apparatus is fluidically connected to an optional pH reduction apparatus. For example, in FIG. 5, desalination apparatus 524 is fluidically connected to pH reduction apparatus 516 via streams 518 and 522. In certain embodiments, the desalination apparatus is fluidically connected to an optional VOM removal apparatus. For example, in FIG. 5, desalination apparatus 524 is fluidically connected to VOM removal apparatus 520 via stream 522.

In some embodiments, the desalination apparatus can be directly fluidically connected to a VOM removal apparatus. For example, in FIG. 5, desalination apparatus 524 is directly fluidically connected to VOM removal apparatus 520 via stream 522. In some embodiments, the desalination apparatus can be directly fluidically connected to one or more other unit operations. In some embodiments, the desalination apparatus is directly fluidically connected to a separator. In some embodiments, the desalination apparatus is directly fluidically connected to a suspended solids removal apparatus. In some embodiments, the desalination apparatus is directly fluidically connected to an ion-removal apparatus. According to certain embodiments, the desalination apparatus is directly fluidically connected to a pH reduction apparatus.

In some embodiments, a disinfection unit can be included in the water desalination system. The disinfection unit may be, for example, a chlorination system configured to add chlorine to the water. According to some embodiments, the disinfection unit can be configured to receive at least a portion of the desalinated water containing stream produced by the desalination apparatus. For example, referring to FIG. 5, water desalination system 500 can comprise optional disinfection unit 530. Disinfection unit 530 can be configured to receive at least a portion of water containing stream 525 from desalination unit 524. In some embodiments, disinfection unit 530 can be configured to receive disinfectant stream 531, which can contain, for example, chlorine. Disinfection unit 530 can be configured to produce disinfected water containing stream 532.

While separator 502, suspended solids removal apparatus 508, ion-removal apparatus 512, pH reduction apparatus 516, VOM removal apparatus 520, and desalination apparatus 524 are shown in FIG. 5 as being arranged in a particular order, it should be understood that in other embodiments, these components may be alternatively arranged.

In some embodiments, for example, the input stream received by the suspended solids removal apparatus comprises at least a portion of the immiscible phase-diminished stream produced by the separator. That is to say, in certain embodiments, the suspended solids removal apparatus can be located downstream of the separator. Referring to FIG. 5, for example, input stream 506 received by suspended solids removal apparatus 508 comprises at least a portion of the immiscible phase-diminished stream (also stream 506) produced by separator 502. In other embodiments, the input stream received by the separator comprises at least a portion of the suspended solids-diminished stream produced by the suspended solids removal apparatus. That is to say, in certain embodiments, the separator can be located downstream of the suspended solids removal apparatus.

In certain embodiments, the input stream received by the ion-removal apparatus comprises at least a portion of the immiscible phase-diminished stream produced by the separator. That is to say, in certain embodiments, the ion-removal apparatus can be located downstream of the separator. Referring to FIG. 5, for example, input stream 510 received by ion-removal apparatus 512 comprises at least a portion of immiscible phase-diminished stream 506 produced by separator 502. In other embodiments, the input stream received by the separator comprises at least a portion of the ion-diminished stream produced by the ion-removal apparatus. That is to say, in certain embodiments, the separator can be located downstream of the ion-removal apparatus.

In certain embodiments, the input stream received by the pH reduction apparatus comprises at least a portion of the immiscible phase-diminished stream produced by the separator. That is to say, in certain embodiments, the pH reduction apparatus can be located downstream of the separator. Referring to FIG. 5, for example, input stream 514 received by pH reduction apparatus 516 comprises at least a portion of immiscible phase-diminished stream 506 produced by separator 502. In other embodiments, the input stream received by the separator comprises at least a portion of the pH-reduced stream produced by the pH reduction apparatus. That is to say, in certain embodiments, the separator can be located downstream of the pH reduction apparatus.

In some embodiments, the input stream received by the volatile organic material (VOM) removal apparatus comprises at least a portion of the immiscible phase-diminished stream produced by the separator. That is to say, in certain embodiments, the VOM removal apparatus can be located downstream of the separator. Referring to FIG. 5, for example, input stream 518 received by VOM removal apparatus 520 comprises at least a portion of immiscible phase-diminished stream 506 produced by separator 502. In other embodiments, the input stream received by the separator comprises at least a portion of the VOM-diminished stream produced by the VOM removal apparatus. That is to say, in certain embodiments, the separator can be located downstream of the VOM removal apparatus.

In some embodiments, the aqueous stream received by the desalination apparatus comprises at least a portion of the immiscible phase-diminished stream produced by the separator. That is to say, in certain embodiments, the desalination apparatus is downstream of the separator. For example, referring to FIG. 5, input stream 522 received by desalination apparatus 524 comprises at least a portion of immiscible phase-diminished stream 506 produced by separator 502.

In some embodiments, the input stream received by the ion-removal apparatus comprises at least a portion of the suspended-solids-diminished stream produced by the suspended solids removal apparatus. That is to say, in certain embodiments, the ion-removal apparatus can be located downstream of the suspended solids removal apparatus. Referring to FIG. 5, for example, input stream 510 received by ion-removal apparatus 512 comprises at least a portion of suspended solids-diminished stream (also stream 510) produced by suspended solids removal apparatus 508. In other embodiments, the input stream received by the suspended solids removal apparatus comprises at least a portion of the ion-diminished stream produced by the ion-removal apparatus. That is to say, in certain embodiments, the suspended solids removal apparatus can be located downstream of the ion-removal apparatus.

In certain embodiments, the input stream received by the pH reduction apparatus comprises at least a portion of the suspended-solids-diminished stream produced by the suspended solids removal apparatus. That is to say, in certain embodiments, the pH reduction apparatus can be located downstream of the suspended solids removal apparatus. Referring to FIG. 5, for example, input stream 514 received by pH reduction apparatus 516 comprises at least a portion of suspended solids diminished stream 510 produced by suspended solids removal apparatus 508. In other embodiments, the input stream received by the suspended solids removal apparatus comprises at least a portion of the pH-reduced stream produced by the pH reduction apparatus. That is to say, in certain embodiments, the suspended solids removal apparatus can be located downstream of the pH reduction apparatus.

In some embodiments, the input stream received by the VOM removal apparatus comprises at least a portion of the suspended-solids-diminished stream produced by the suspended solids removal apparatus. That is to say, in certain embodiments, the VOM removal apparatus can be located downstream of the suspended solids removal apparatus. Referring to FIG. 5, for example, input stream 518 received by VOM removal apparatus 520 comprises at least a portion of suspended solids-diminished stream 510 produced by suspended solids removal apparatus 508. In other embodiments, the input stream received by the suspended solids removal apparatus comprises at least a portion of the VOM-diminished stream produced by the VOM removal apparatus. That is to say, in certain embodiments, the suspended solids removal apparatus can be located downstream of the VOM removal apparatus.

In some embodiments, the aqueous stream received by the desalination apparatus comprises at least a portion of the suspended solids-diminished stream produced by the suspended solids removal apparatus. That is to say, in certain embodiments, the desalination apparatus is downstream of the suspended solids removal apparatus. For example, referring to FIG. 5, input stream 522 received by desalination apparatus 524 comprises at least a portion of suspended solids-diminished stream 510 produced by suspended solids removal apparatus 508.

In certain embodiments, the input stream received by the pH reduction apparatus comprises at least a portion of the ion-diminished stream produced by the ion-removal apparatus. That is to say, in certain embodiments, the pH reduction apparatus can be located downstream of the ion-removal apparatus. Referring to FIG. 5, for example, input stream 514 received by pH reduction apparatus 516 comprises at least a portion of ion-diminished stream (also stream 514) produced by ion-removal apparatus 512. In other embodiments, the input stream received by the ion-removal apparatus comprises at least a portion of the pH-reduced stream produced by the pH reduction apparatus. That is to say, in certain embodiments, the ion-removal apparatus can be located downstream of the pH reduction apparatus.

In some embodiments, the input stream received by the VOM removal apparatus comprises at least a portion of the ion-diminished stream produced by the ion-removal apparatus. That is to say, in certain embodiments, the VOM removal apparatus can be located downstream of the ion-removal apparatus. Referring to FIG. 5, for example, input stream 518 received by VOM removal apparatus 520 comprises at least a portion of ion-diminished stream 514 produced by ion-removal apparatus 512. In other embodiments, the input stream received by the ion-removal apparatus comprises at least a portion of the VOM-diminished stream produced by the VOM removal apparatus. That is to say, in certain embodiments, the ion-removal apparatus can be located downstream of the VOM removal apparatus.

In some embodiments, the aqueous stream received by the desalination apparatus comprises at least a portion of the ion-diminished stream produced by the ion-removal apparatus. That is to say, in certain embodiments, the desalination apparatus is downstream of the ion-removal apparatus. For example, referring to FIG. 5, input stream 522 received by desalination apparatus 524 comprises at least a portion of ion-diminished stream 514 produced by ion-removal apparatus 512.

In some embodiments, the input stream received by the VOM removal apparatus comprises at least a portion of the pH-reduced stream produced by the pH reduction apparatus. That is to say, in certain embodiments, the VOM removal apparatus can be located downstream of the pH reduction apparatus. Referring to FIG. 5, for example, input stream 518 received by VOM removal apparatus 520 comprises at least a portion of pH-reduced stream (also stream 518) produced by pH reduction apparatus 516. In other embodiments, the input stream received by the pH reduction apparatus comprises at least a portion of the VOM-diminished stream produced by the VOM removal apparatus. That is to say, in certain embodiments, the pH reduction apparatus can be located downstream of the VOM removal apparatus.

In some embodiments, the aqueous stream received by the desalination apparatus comprises at least a portion of the pH-reduced stream produced by the pH reduction apparatus. That is to say, in certain embodiments, the desalination apparatus is downstream of the pH reduction apparatus. For example, referring to FIG. 5, input stream 522 received by desalination apparatus 524 comprises at least a portion of pH reduced stream 518 produced by pH reduction apparatus 516.

In some embodiments, the aqueous stream received by the desalination apparatus comprises at least a portion of the VOM-diminished stream produced by the VOM removal apparatus. That is to say, in certain embodiments, the desalination apparatus is downstream of the VOM removal apparatus. For example, referring to FIG. 5, input stream 522 received by desalination apparatus 524 comprises at least a portion of VOM-diminished stream (also stream 522) produced by VOM removal apparatus 520. In other embodiments, the input stream received by the VOM removal apparatus comprises at least a portion of the water-containing, low salt concentration stream produced by the desalination apparatus. That is to say, in certain embodiments, the VOM removal apparatus can be located downstream of the desalination apparatus.

Each of separator 502, suspended solids removal apparatus 508, ion-removal apparatus 512, pH reduction apparatus 516, and VOM removal apparatus 520 is an optional feature of the water desalination system. In some embodiments, the water desalination system comprises only one of separator 502 suspended solids removal apparatus 508, ion-removal apparatus 512, pH reduction apparatus 516, and VOM removal apparatus 520. In some embodiments, the water desalination system comprises any combination of two or more of separator 502, suspended solids removal apparatus 508, ion-removal apparatus 512, pH reduction apparatus 516, and VOM removal apparatus 520.

In some embodiments, the water treatment system comprises a precipitation apparatus. Referring back to the exemplary embodiment of FIG. 5, water treatment system 500 comprises optional precipitation apparatus 534. The precipitation apparatus may be, in certain embodiments, fluidically connected to the desalination apparatus. In some such embodiments, the precipitation apparatus is configured to receive at least a portion of a concentrated saline stream output by the desalination apparatus. For example, in FIG. 5, precipitation apparatus 534 is fluidically connected to desalination apparatus 524 and configured to receive concentrated saline stream 526 from desalination apparatus 524.

As described elsewhere herein, the precipitation apparatus is, in certain embodiments, configured to precipitate at least a portion of the dissolved monovalent salt from the concentrated saline stream to produce a product stream containing less of the dissolved monovalent salt relative to the concentrated saline stream. For example, in FIG. 5, precipitation apparatus 534 can be configured such that at least a portion of the dissolved monovalent salt within concentrated saline stream 526 precipitates within precipitation apparatus 534 to produce water-containing product stream 536, which contains less dissolved monovalent salt than concentrated saline stream 526.

Precipitation apparatus 534 in FIG. 5 can have any of the configurations described elsewhere herein and/or can be operated in the same manner as any of the precipitation apparatuses described elsewhere herein. For example in some embodiments, precipitation apparatus 534 in FIG. 5 corresponds to precipitation apparatus 114 in FIG. 1.

As noted elsewhere, in certain embodiments, the precipitation apparatus is directly fluidically connected to the desalination apparatus. For example in FIG. 5, precipitation apparatus 534 is directly fluidically connected to desalination apparatus 524 via concentrated saline stream 526. It should be understood, however, that the invention is not limited to embodiments in which the precipitation apparatus and the desalination apparatus are directly fluidically connected, and in other embodiments, the precipitation apparatus and the desalination apparatus are fluidically connected but are not directly fluidically connected.

Figure 6:
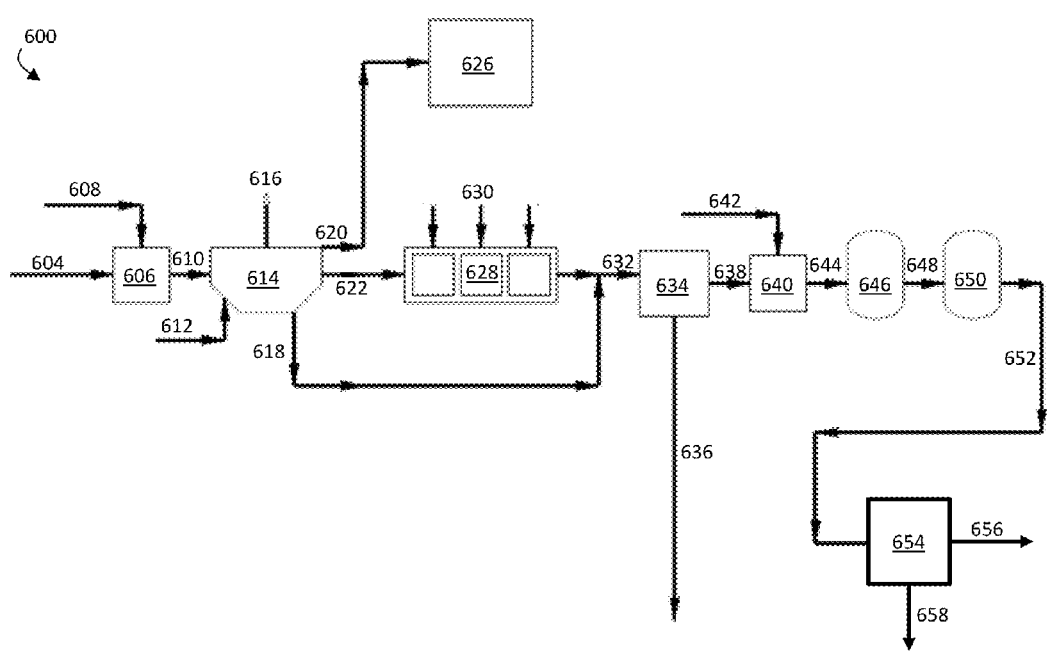
FIG. 6 is a schematic illustration of an exemplary water treatment system, according to one set of embodiments.

FIG. 6 is a schematic illustration of an exemplary water treatment system 600, according to certain embodiments. In FIG. 6, aqueous input stream 604 is transported to optional tank 606. In some embodiments, chemicals are added to optional tank 606 via stream 608. The chemicals can be selected to aid in a downstream apparatus, according to certain embodiments. For example, in some embodiments, a skimmer (which can be part of a dissolved gas flotation apparatus, for example) can be positioned downstream of tank 606, and the chemicals added to tank 606 are selected to aid in operation of the skimmer (e.g., in a dissolved gas flotation process). Aqueous stream 610 can be transported out of tank 606. Aqueous stream 610 can be transported to skimmer 614. In some embodiments, skimmer 614 can be configured to remove at least a portion of a suspended and/or emulsified water-immiscible phase within stream 610 to produce an immiscible phase-diminished stream 622 (and, in some embodiments, immiscible phase-diminished stream 618). The water-immiscible phase from skimmer 614 can be transported, for example, to a recovery tank 626 via stream 620. In some embodiments, skimmer 614 is part of a dissolved gas flotation apparatus. In some such embodiments, compressed gas (e.g., air) can be added, via stream 614, to a tank containing the treated water, which can aid in the transport of immiscible material to the top of the tank. Gas can subsequently be transported out of the tank via stream 616.

In some embodiments, ion-removal apparatus 628 can be configured to receive at least a portion of immiscible phase-diminished stream 622. In some embodiments, ion-removal apparatus 628 is configured to remove at least a portion of scale forming ions within stream 622 to produce an ion-diminished stream 632. In some such embodiments, ion-removal apparatus 628 produces ion-diminished stream 632 using a chemical reagent. For example, in FIG. 6, chemical reagent can be transported to ion-removal apparatus 628 via stream 630. The chemical reagent can be, for example, soda ash, caustic soda, and the like.

In certain embodiments, a portion of the immiscible phase-diminished stream produced by skimmer 614 can bypass ion-removal apparatus 628. For example, in FIG. 6, at portion of the immiscible phase-diminished stream from skimmer 614 bypasses ion-removal apparatus 628 via stream 618. The contents of bypass stream 618 may be merged with the contents of stream 632 downstream of ion-removal apparatus 628.

In some embodiments, a filter in configured to receive at least a portion of the immiscible phase-diminished stream and/or at least a portion of the ion diminished stream. For example, in FIG. 6, filter 634 is configured to receive ion-diminished stream 632 and/or immiscible phase-diminished stream 618. In certain embodiments, filter 634 is configured to remove at least a portion of suspended solids from the immiscible phase-diminished stream portion and/or the ion-diminished stream portion received by the filter to produce a suspended-solids-diminished stream. For example, in FIG. 6, filter 634 is configured to remove at least a portion of suspended solids from stream 632 to produce suspended-solids-diminished stream 638. In addition, in FIG. 6, filter 634 is configured to produce solids-containing stream 636.

In certain embodiments, a pH reduction step can be included in the process. For example, in FIG. 6, optional tank 640 can be configured to receive suspended-solids-diminished stream 638 and to output pH-reduced stream 644. Tank 640 can be configured, in some embodiments, to receive an acid and/or a base via stream 642. In some such embodiments, acid and/or base may be added to tank 640 until the pH of the contents of tank 640 reaches a desired level. According to certain embodiments, the contents of tank 640 may be output via stream 644, once the pH has reached a desired level.

In some embodiments, optional filter 646 can be included in the system. Filter 646 can be used to remove one or more solid materials from pH-reduced stream 644 to produce filtered stream 648.

According to certain embodiments, a carbon bed is configured to receive at least a portion of the suspended-solids-diminished stream. For example, in FIG. 6, carbon bed 650 is configured to receive stream 648, which contains at least a portion of the suspended-solids-diminished stream produced by filter 634. Carbon bed 650 can be configured to remove at least a portion of VOM from the suspended-solids-diminished stream portion received by the carbon bed to produce a VOM-diminished stream. For example, in FIG. 6, carbon bed 650 is configured to produce VOM-diminished stream 652.

In some embodiments, desalination apparatus is configured to receive at least a portion of the VOM-diminished stream and to remove at least a portion of water from the VOM diminished stream received by the desalination apparatus. For example, in FIG. 6 desalination apparatus 654 is configured to receive VOM-diminished stream 652. In addition, desalination apparatus 654 is configured to produce concentrated saline stream 656, which is enriched in at least one dissolved monovalent salt relative to VOM-diminished stream 652. In some embodiments, the desalination apparatus can also produce a water-containing stream that contains a lower concentration of the dissolved salt (e.g., dissolved monovalent salt) than the stream fed to the desalination apparatus. For example, in FIG. 6, desalination apparatus 654 can be configured to produce water-containing stream 658, which contains less of a dissolved salt (e.g., less of a dissolved monovalent salt) than stream 652 fed to desalination apparatus 654.

In certain embodiments, the order of the desalination apparatus and the carbon bed can be switched, relative to the order shown in FIG. 6. For example, in some embodiments, the desalination apparatus is configured to receive at least a portion of the suspended-solids-diminished stream, and to remove at least a portion of water from the suspended-solids-diminished stream portion received by the desalination apparatus to produce a concentrated saline stream enriched in a dissolved monovalent salt relative to the suspended-solids-diminished stream portion received by the desalination apparatus. The desalination apparatus can also be configured to produce a water-containing stream containing less of the dissolved monovalent salt than the suspended-solids-diminished stream. In some such embodiments, the carbon bed can be configured to receive at least a portion of the water-containing stream produced by the desalination apparatus, and to remove at least a portion of VOM from the water-containing stream portion received by the carbon bed to produce a VOM-diminished stream.

Figure 7:
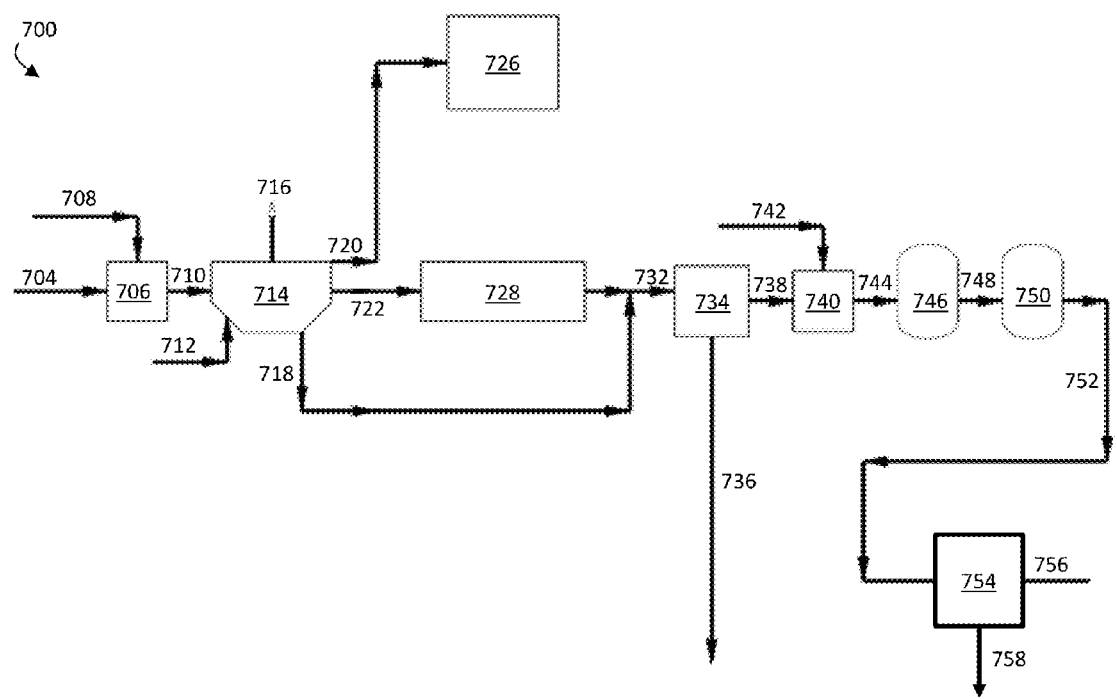
FIG. 7 is, according to certain embodiments, a schematic illustration of an exemplary water treatment system.

FIG. 7 is a schematic illustration of another exemplary water treatment system 700, according to certain embodiments. In FIG. 7, aqueous input stream 704 is transported to optional tank 706. In some embodiments, chemicals are added to optional tank 706 via stream 708. The chemicals can be selected to aid in a downstream apparatus, according to certain embodiments. For example, in some embodiments, a skimmer (which can be part of a dissolved gas flotation apparatus, for example) can be positioned downstream of tank 706, and the chemicals added to tank 706 are selected to aid in operation of the skimmer (e.g., in a dissolved gas flotation process). Aqueous stream 710 can be transported out of tank 706. Aqueous stream 710 can be transported to skimmer 714. In some embodiments, skimmer 714 can be configured to remove at least a portion of suspended and/or emulsified water-immiscible phase within stream 710 to produce an immiscible phase-diminished stream 722 (and, in some embodiments, immiscible phase-diminished stream 718). The water-immiscible phase from skimmer 714 can be transported, for example, to a recovery tank 726 via stream 720. In some embodiments, skimmer 714 is part of a dissolved gas flotation apparatus. In some such embodiments, compressed gas (e.g., air) can be added, via stream 712, to a tank containing the treated water, which can aid in the transport of immiscible material to the top of the tank. Gas can subsequently be transported out of the tank via stream 716.

In some embodiments, electrocoagulation apparatus 728 can be configured to receive at least a portion of water-immiscible phase-diminished stream 722. Electrocoagulation apparatus 728 can be configured to remove at least a portion of scale forming ions within stream 722 to produce an ion-diminished stream 732.

In certain embodiments, a portion of water-immiscible phase-diminished stream produced by skimmer 714 can bypass electrocoagulation apparatus 728. For example, in FIG. 7, a portion of the immiscible phase-diminished product from skimmer 714 bypasses electrocoagulation apparatus 728 via stream 718. The contents of bypass stream 718 may be merged with the contents of stream 732 downstream of electrocoagulation apparatus 728.

Filter 734 can be configured to receive ion-diminished stream 732 and/or immiscible phase-diminished stream 718. Filter 734 can be configured to remove at least a portion of suspended solids from stream 732 to produce suspended-solids-diminished stream 738. In addition, filter 734 can be configured to produce solids-containing stream 736.

In certain embodiments, a pH reduction step can be included in the process. For example, in FIG. 7, optional tank 740 can be configured to receive suspended-solids-diminished stream 738 and to produce pH-reduced stream 744. Optional tank 740 can be configured, in some embodiments, to receive an acid and/or a base via stream 742. In some such embodiments, acid and/or base may be added to tank 740 until the pH of the contents of tank 740 reaches a desired level. According to certain embodiments, the contents of tank 740 may be output via stream 744, once the pH has reached a desired level.

In some embodiments, optional filter 746 can be included in the system. Filter 746 can be used to remove one or more solid materials from pH-reduced stream 744 to produce filtered stream 748.

Carbon bed 750 can be configured to receive stream 748, which contains at least a portion of the suspended-solids-diminished stream produced by filter 734. Carbon bed 750 can be configured to remove at least a portion of VOM from the suspended-solids-diminished stream portion received by the carbon bed to produce a VOM-diminished stream 752.

Desalination apparatus 754 can be configured to receive VOM-diminished stream 752. Desalination apparatus 754 can be configured to produce concentrated saline stream 756, which is enriched in at least one dissolved monovalent salt relative to VOM-diminished stream 752. Desalination apparatus 754 can also be configured to produce water-containing stream 758, which contains less of a dissolved salt (e.g., less of a dissolved monovalent salt) than stream 752 fed to desalination apparatus 754.

In certain embodiments, the order of the desalination apparatus and the carbon bed can be switched, relative to the order shown in FIG. 7. For example, in some embodiments, the desalination apparatus is configured to receive at least a portion of the suspended-solids-diminished stream, and to remove at least a portion of water from the suspended-solids-diminished stream portion received by the desalination apparatus to produce a concentrated saline stream enriched in a dissolved monovalent salt relative to the suspended-solids-diminished stream portion received by the desalination apparatus. The desalination apparatus can also be configured to produce a water-containing stream containing less of the dissolved monovalent salt than the suspended-solids-diminished stream. In some such embodiments, the carbon bed can be configured to receive at least a portion of the water-containing stream produced by the desalination apparatus, and to remove at least a portion of VOM from the water-containing stream portion received by the carbon bed to produce a VOM-diminished stream.

Figure 8:
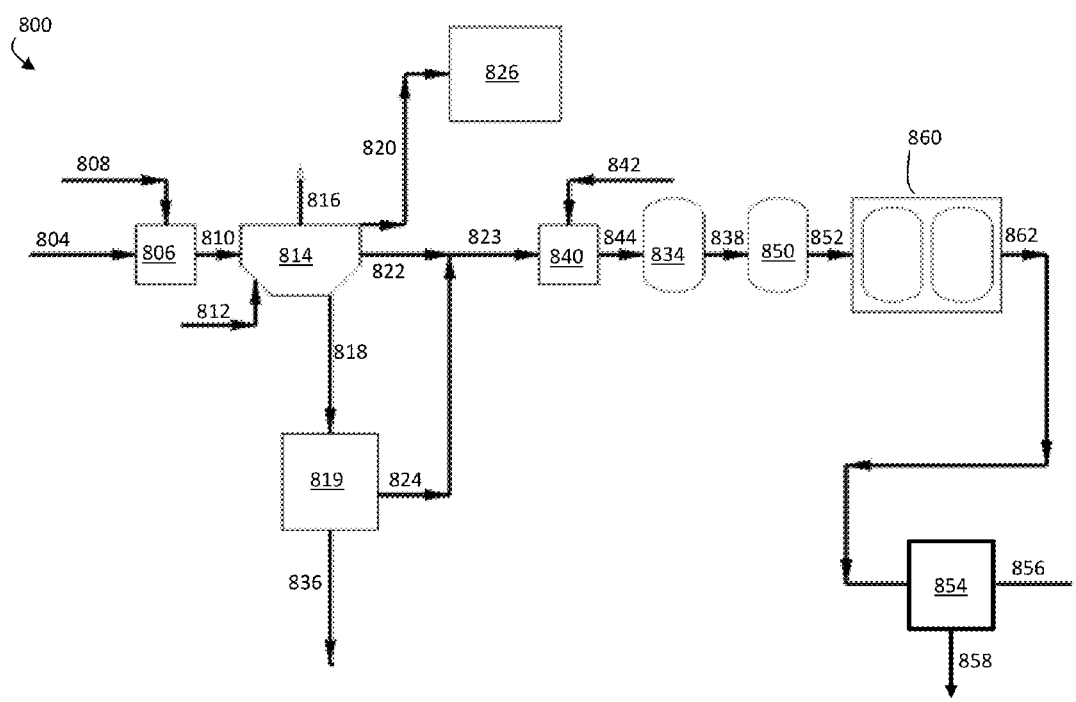
FIG. 8 is, according to some embodiments, a schematic illustration of an exemplary water treatment system.

FIG. 8 is a schematic illustration of another exemplary water treatment system 800, according to certain embodiments. In FIG. 8, aqueous input stream 804 is transported to optional tank 806. In some embodiments, chemicals are added to optional tank 806 via stream 808. The chemicals can be selected to aid in a downstream apparatus, according to certain embodiments. For example, in some embodiments, a skimmer (which can be part of a dissolved gas flotation apparatus, for example) can be positioned downstream of tank 806, and the chemicals added to tank 806 are selected to aid in operation of the skimmer (e.g., in a dissolved gas flotation process). Aqueous stream 810 can be transported out of tank 806. Aqueous stream 810 can be transported to skimmer 814. In some embodiments, skimmer 814 can be configured to remove at least a portion of suspended and/or emulsified water-immiscible phase within stream 810 to produce an immiscible phase-diminished stream 822 (and, in some embodiments, immiscible phase-diminished stream 818). The water-immiscible phase from skimmer 814 can be transported, for example, to a recovery tank 826 via stream 820. In some embodiments, skimmer 814 is part of a dissolved gas flotation apparatus. In some such embodiments, compressed gas (e.g., air) can be added, via stream 812, to a tank containing the treated water, which can aid in the transport of immiscible material to the top of the tank. Gas can subsequently be transported out of the tank via stream 816.

In certain embodiments, a portion of water-immiscible phase-diminished stream produced by skimmer 814 can be transported to filter 819, for example, via stream 818. filter 819 can be configured to remove at least a portion of suspended solids from immiscible phase-diminished stream portion 818 received by filter 819 to produce a suspended-solids-diminished stream 824. Filter 819 can also be configured to produce a solids-containing stream 836.

In some embodiments, a portion of the water-immiscible phase-diminished stream produced by skimmer 814 can bypass filter 819. For example, in FIG. 8, a portion 822 of the immiscible phase-diminished product from skimmer 814 bypasses filter 819 via stream 822. The contents of bypass stream 822 may be merged with the contents of stream 824 downstream of filter 819 and skimmer 814 to produce stream 823.

In certain embodiments, an optional pH reduction step can be included in the process. For example, in FIG. 8, optional tank 840 can be configured to receive suspended-solids-diminished stream 823 and to produce pH-reduced stream 844. Optional tank 840 can be configured, in some embodiments, to receive an acid and/or a base via stream 842. In some such embodiments, acid and/or base may be added to tank 840 until the pH of the contents of tank 840 reaches a desired level. According to certain embodiments, the contents of tank 840 may be output via stream 844, once the pH has reached a desired level.

In some embodiments, media filter 834 can be configured to receive pH-reduced stream 844 (and/or suspended solids-diminished stream 823). Media filter 834 can be configured to remove at least a portion of suspended solids from stream 832 to produce stream 838.

In some embodiments, a carbon bed can be included in the system. For example, referring to FIG. 8, Carbon bed 850 can be configured to receive stream 838, which contains at least a portion of the stream produced by filter 834. Carbon bed 850 can be configured to remove at least a portion of VOM from the stream received by the carbon bed to produce a VOM-diminished stream 852.

In some embodiments, a resin bed can be included in the system. For example, in FIG. 8, resin bed 860 can be configured to receive at least a portion of VOM-diminished stream 852. Resin bed 860 can be configured to remove at least a portion of at least one scale-forming ion from VOM-diminished stream portion 852 received by resin bed 860 to produce ion-diminished stream 862 containing less of the scale-forming ion relative to input stream 852 received by resin bed 860.

In some embodiments, desalination apparatus 854 can be configured to receive ion-diminished stream 862. Desalination apparatus 854 can be configured to produce concentrated saline stream 856, which is enriched in at least one dissolved monovalent salt relative to ion-diminished stream 862. Desalination apparatus 854 can also be configured to produce water-containing stream 858, which contains less of a dissolved salt (e.g., less of a dissolved monovalent salt) than stream 862 fed to desalination apparatus 854.

In certain embodiments, the order of the desalination apparatus and the carbon bed can be switched, relative to the order shown in FIG. 8. For example, in some embodiments, the desalination apparatus is configured to receive at least a portion of the suspended-solids-diminished stream, and to remove at least a portion of water from the suspended-solids-diminished stream portion received by the desalination apparatus to produce a concentrated saline stream enriched in a dissolved monovalent salt relative to the suspended-solids-diminished stream portion received by the desalination apparatus. The desalination apparatus can also be configured to produce a water-containing stream containing less of the dissolved monovalent salt than the suspended-solids-diminished stream. In some such embodiments, the carbon bed can be configured to receive at least a portion of the water-containing stream produced by the desalination apparatus, and to remove at least a portion of VOM from the water-containing stream portion received by the carbon bed to produce a VOM-diminished stream.

The stream that is input to the water treatment system (e.g., streams 504 in FIG. 5, 604 in FIG. 6, 704 in FIG. 7, and/or 804 in FIG. 8) can originate from a variety of sources. For example, in certain embodiments, at least a portion of a stream fed to the water treatment system comprises and/or is derived from seawater, ground water, brackish water, water from an oil or gas well, and/or the effluent of a chemical process (e.g., the effluent of another desalination system, or another chemical process).

In certain embodiments, the water desalination system is operated such that little or no brine is left to be disposed from the system (also sometimes referred to as a "zero liquid discharge" system). In some such embodiments, the system produces a salt product and a fresh water product. The salt product can be produced, for example, as a product of a crystallization or other precipitation step.

The following examples are intended to illustrate certain embodiments of the present invention, but do not exemplify the full scope of the invention.

EXAMPLE

This example describes the operation of a water desalination system in which an ion-removal apparatus is used to inhibit the formation of scale.

Figure 3A:
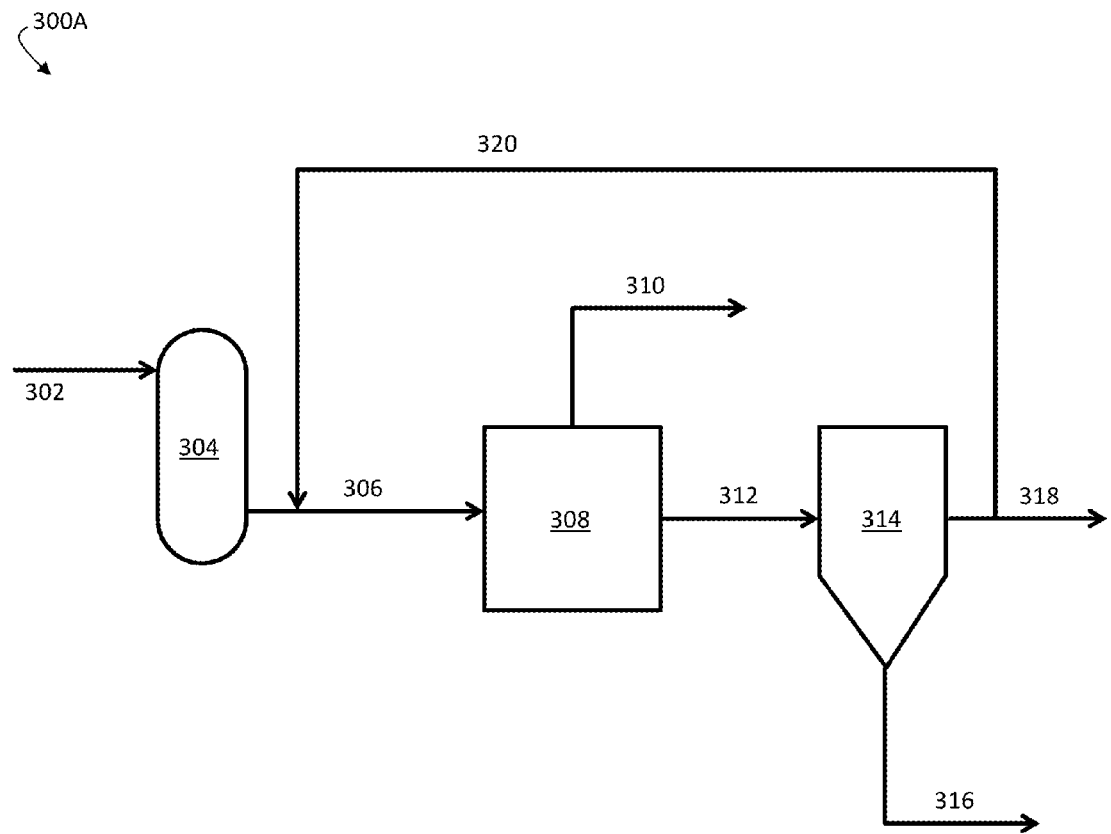
FIG. 3A is a schematic illustration of an exemplary desalination system comprising an ion-removal apparatus, according to one embodiment.

FIG. 3A is a schematic illustration of water desalination system 300A used to perform the experiments in this example. The water desalination system 300A included ion-removal apparatus 304, desalination apparatus 308, and precipitation apparatus 314.

Figure 3B:
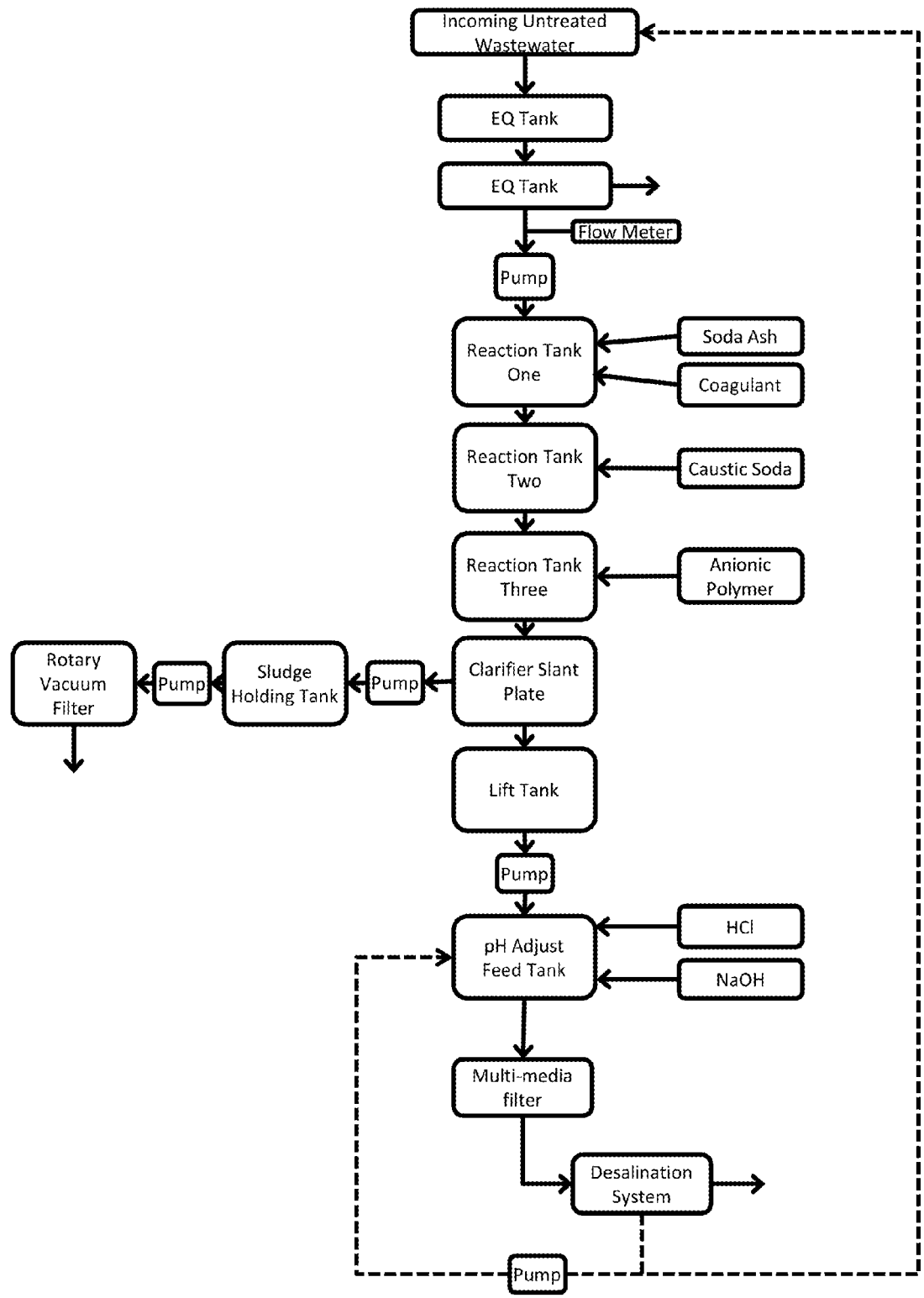
FIG. 3B is, according to certain embodiments, a schematic illustration of an exemplary ion-removal apparatus.

Ion removal apparatus 304 included two, 3000-gallon flow equalization tanks, followed by three reaction tanks, a clarifier, a lift tank, a pH adjustment tank, and a multi-media filter (each not separately illustrated). A schematic diagram of the ion-removal apparatus is shown in FIG. 3B. The ion-removal apparatus was configured to handle between about 4500 barrels and about 10,000 barrels of water per day. (All references to "barrels" herein refer to U.S. oil barrels (i.e., 42 gallons)). The incoming saline water was first fed to the two flow equalization tanks. The flow equalization tanks were used to settle and skim oil and grease out of the saline water. The contents of the flow equalization tanks were pumped to a first 2800 gallon reaction tank. In the first reaction tank, soda ash and a coagulant were added, which led to the formation of insoluble carbonates of calcium, magnesium, barium and strontium. The contents of the first reaction tank were then transported to a second reaction tank (2800 gallons), to which caustic soda was added, causing the formation of insoluble hydroxides and carbonates of calcium and magnesium. The contents of the second reaction tank were then transported to a third reaction tank (1300 gallons), to which an anionic copolymer of acrylamide and acrylic acid was added. In the third reaction tank, solids coagulated to form larger solid particles. The contents of the third reaction tank were transported to a slant plate clarifier, where the water was separated from the precipitated and coagulated solids. Next, the water within the clarifier was transported to a 1000 gallon lift tank and subsequently to a 2000 gallon pH adjustment tank, to which hydrochloric acid or sodium hydroxide were added to adjust the water to a pH of about 7. The water was brought to a neutral pH to reduce scaling of any scale-forming ions that were not fully removed via the reaction tanks. The sludge from the clarifier was sent to a rotary vacuum drum filter where a thick cake of the solids was formed for subsequent disposal.

The pH adjustment tank output contained an ion-diminished stream, which was subsequently transported to desalination apparatus 308. The desalination apparatus included a humidification/dehumidification system, configured in a similar manner as that described with respect to FIG. 2.

A packed bed humidifier was used in the humidification/dehumidification system. A carrier gas was fed to the humidifier at a flow rate of 4000 cubic feet per minute for every 500 U.S. barrels per day of fresh water produced. Humidification of the carrier gas was achieved by distributing ion-diminished stream 308 from notched troughs located at the top of the humidifier through a glass-filled polypropylene packing material while the carrier gas traveled through the humidification chamber. The humidified carrier gas was subsequently transported to a custom designed, 8-stage, stainless steel bubble column condenser in fluid communication with a heat exchanger. The stages were arranged vertically within the bubble column condenser, with a sump volume located beneath the stages and in fluid communication with the outlet of the condenser. Each stage comprised a sparger plate (1.8 m long, 0.6 m wide, and 0.06 m tall, having a plurality of holes with a diameter of about 0.003 m) and a chamber in which a liquid bath could reside. A first gas inlet was positioned below the sparger plate located near the bottom of the bubble column condenser, and a second gas inlet was positioned at an intermediate location between the inlet and the outlet. A liquid inlet and a droplet eliminator coupled to a gas outlet were positioned above the top-most stage.

Figure 3C:
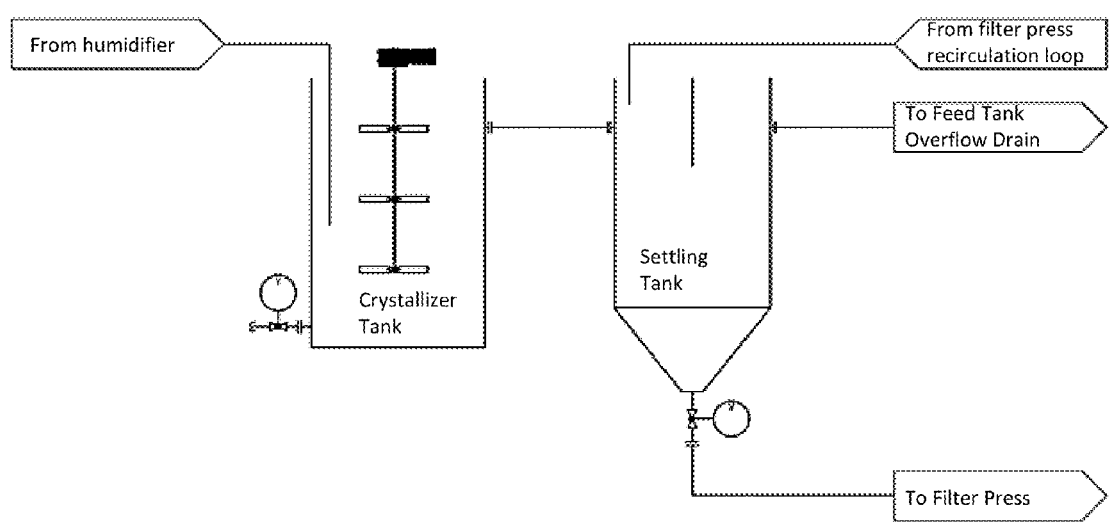
FIG. 3C is a schematic illustration of an exemplary precipitation apparatus.

A concentrated saline stream 312 was output from the humidifier of the desalination apparatus and subsequently transported to precipitation apparatus 314. Using precipitation apparatus 314, the dissolved monovalent salts were precipitated and removed from the concentrated saline stream. The precipitation apparatus included a 6000 gallon flat bottom stirred tank in which crystallization was performed. Crystallization was commenced by allowing the contents of saline stream 312 to form a quiescent zone at the bottom of the flat bottom tank. Subsequently, the contents of the flat bottom tank were transported to a 6000 gallon cone bottom settling tank. A schematic diagram of the ion-removal apparatus is shown in FIG. 3C.

The contents of various streams within system 300A are shown in Table 1 below.

The desalination system was run such that the recovery ratio (i.e., the ratio of the amount of purified water recovered from the system to the amount of saline water fed to the system) was 0.80 and the concentration ratio (i.e., the ratio of the volume of brine removed from the desalination apparatus to the volume of saline water fed to the system) was 0.23.

Saline water including the components shown in Table 1 (under "Stream 302") was fed to ion-removal apparatus at a mass flow rate of 9.1 kg/s. As can be seen from Table 1, the saline feed stream 302 fed to ion-removal apparatus 304 included relatively high concentrations of sulfate, calcium, iron, and magnesium, as shown in Table 1. These components were removed from the saline stream via ion-removal apparatus 304 prior to the saline stream being transported to the desalination apparatus 308 and precipitation apparatus 314, resulting in the production of 0.14 kg of sludge removed from the system per barrel of water fed to the ion-removal system. Accordingly, the supersaturation index of $CaSO_4$ in the saline stream remained well below 1 within both desalination apparatus 308 and precipitation apparatus 314, as shown in Table 1. Therefore, substantially no scaling was observed within the desalination apparatus and the precipitation apparatus. In addition, 7.32 kilograms of salt sludge per barrel of water fed to the desalination system was removed, via stream 316, using precipitation apparatus 314.

Comparative Example

This example describes the operation of the water desalination system of the preceding example, but in which the ion-removal apparatus is not included. As shown in this example, precipitation of monovalent salts could not be achieved at conditions in which scaling does not occur.

Figure 3D:
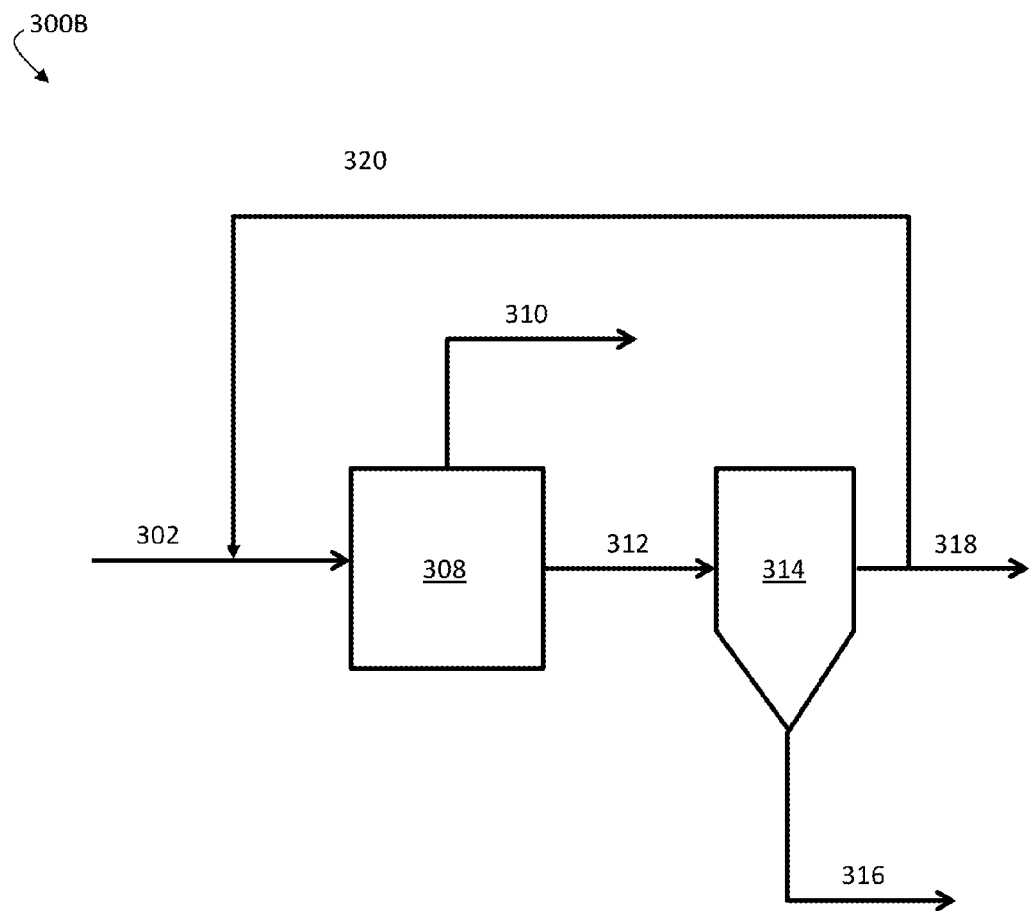
FIG. 3D is, according to one embodiment, a schematic illustration of an exemplary desalination system that does not include an ion-removal apparatus.

FIG. 3D is a schematic illustration of water desalination system 300B used to perform the experiments in this example. Unlike water desalination system 300A described in the preceding example, desalination system 300B did not include ion-removal apparatus 304, and aqueous feed stream 302 was fed directly to desalination apparatus 308.

In a first set of experiments, a feed stream with a composition similar to the feed used in the preceding example was fed to desalination system 300B. The desalination system was operated such that the recovery ratio was 0.80

TABLE 1

Contents of streams illustrated in FIG. 3A

| | Stream 302 | Stream 306 | Stream 310 | Stream 312 | Units |
|---|---|---|---|---|---|
| Chlorides | 54901 | 54910 | 67.4 | 188161 | mg/L |
| Sulfate | 350 | ND | ND | ND | mg/L |
| Calcium | 288 | ND | ND | ND | mg/L |
| Iron | 34 | ND | ND | ND | mg/L |
| Magnesium | 44 | ND | ND | ND | mg/L |
| Sodium | 35113 | 35555 | 43.6 | 121839 | mg/L |
| TSS | 811 | ND | ND | ND | mg/L |
| O&G | 620 | ND | ND | ND | mg/L |
| TDS | 90392 | 90465 | 111.0 | 310000 | mg/L |
| Supersaturation index of $CaSO_4$ @ 25° C. | 1.18 | <<<1 | <<<1 | <<<1 | — |
| Supersaturation index of $CaSO_4$ @ 90° C. | 1.99 | <<<1 | <<<1 | <<<1 | — |
| Specific gravity | 1.1 | 1.1 | 1.0 | 1.2 | — |
| Mass flow | 9.1 | 9.1 | 7.3 | 1.5 | kg/s |
| Volume | 4545.5 | 4549.1 | 4000.0 | 681.8 | bpd | and the concentration ratio was 0.23. In this configuration, 7.32 kg of salt sludge per barrel of input water was produced. The contents of various streams within system 300B in this first mode of operation are shown in Table 2 below.

TABLE 2

Contents of streams illustrated in FIG. 3D when a recovery ratio of 0.80 and a concentration ratio of 0.23 are used.

|  | Stream 302 | Stream 310 | Stream 312 | Units |
|---|---|---|---|---|
| Chlorides | 54901 | 67.4 | 185705 | mg/L |
| Sulfate | 350 | ND | 1200 | mg/L |
| Calcium | 288 | ND | 988 | mg/L |
| Iron | 34 | ND | 117 | mg/L |
| Magnesium | 44 | ND | 151 | mg/L |
| Sodium | 35113 | 43.6 | 121839 | mg/L |
| TSS | 811 | ND | ND | mg/L |
| O&G | 620 | ND | ND | mg/L |
| TDS | 90392 | 111.0 | 310000 | mg/L |
| Supersaturation index of $CaSO_4$ @ 25° C. | 0.30 | <<<1 | 3.58 | — |
| Supersaturation index of $CaSO_4$ @ 90° C. | 0.51 | <<<1 | 6.10 | — |
| Specific gravity | 1.1 | 1.0 | 1.2 | — |
| Mass flow | 9.1 | 7.3 | 1.5 | kg/s |
| Volume | 4545.5 | 4000.0 | 681.8 | bpd |

As can be seen from Table 2, the supersaturation index of $CaSO_4$ in the saline stream was well in excess of 1 within desalination apparatus 308. For example, within stream 312, the supersaturation index of $CaSO_4$ at 25° C. was 3.58, and the supersaturation index of $CaSO_4$ at 90° C. was 6.10. Therefore, a large amount of scaling was observed within the desalination apparatus and the precipitation apparatus.

In a second set of experiments, the feed stream components were kept constant, and the desalination system was operated such that the recovery ratio was 0.28 and the concentration ratio was 0.68. The contents of various streams within system 300B in this second mode of operation are shown in Table 3 below.

TABLE 3

Contents of streams illustrated in FIG. 3D when a recovery ratio of 0.28 and a concentration ratio of 0.68 are used.

|  | Stream 302 | Stream 310 | Stream 312 | Units |
|---|---|---|---|---|
| Chlorides | 54901 | 67.4 | 76279 | mg/L |
| Sulfate | 350 | ND | 489 | mg/L |
| Calcium | 288 | ND | 403 | mg/L |
| Iron | 34 | ND | 48 | mg/L |
| Magnesium | 44 | ND | 62 | mg/L |
| Sodium | 35113 | 43.6 | 49088 | mg/L |
| TSS | 811 | ND | ND | mg/L |
| O&G | 620 | ND | ND | mg/L |
| TDS | 90392 | 111.0 | 126368 | mg/L |
| Supersaturation index of $CaSO_4$ @ 25° C. | 0.30 | <<<1 | 0.595 | — |
| Supersaturation index of $CaSO_4$ @ 90° C. | 0.51 | <<<1 | 1.00 | — |
| Specific gravity | 1.1 | 1.0 | 1.2 | — |
| Mass flow | 28.6 | 7.3 | 21.4 | kg/s |
| Volume | 14285.7 | 4000.0 | 9714.3 | bpd |

As can be seen from Table 3, the supersaturation index of $CaSO_4$ in the saline stream was less than 1 at 25° C. and about 1 at 90° C. However, in this configuration, only 28% of the water that enters the system is recovered. In addition, no salt sludge was produced by the precipitation apparatus. Thus, while a large amount of scaling was not observed in the desalination apparatus in this configuration, the monovalent salts remained dissolved in the final water product and the water recovery rate was low.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for desalinating water, comprising:
   removing, within an ion-removal apparatus, at least a portion of at least one scale-forming ion from an aqueous feed stream, the aqueous feed stream comprising the at least one scale-forming ion and at least one dissolved monovalent salt comprising a monovalent cation and a monovalent anion to produce an ion-diminished stream containing less of the scale-forming ion relative to the aqueous feed stream;
   removing, within a desalination apparatus, water from the ion-diminished stream to produce a concentrated saline stream enriched in the dissolved monovalent salt relative to the ion-diminished stream, wherein the removing comprises contacting a gaseous stream with the ion-diminished stream within a humidifier to evaporate water from the ion-diminished stream into the gaseous stream; and
   precipitating, within a precipitation apparatus, at least a portion of the dissolved monovalent salt from the concentrated saline stream to produce a product stream containing less of the dissolved monovalent salt relative to the concentrated saline stream; and
   recycling at least a portion of the product stream to the desalination apparatus;
   wherein:
      the precipitating comprises forming crystals comprising at least a portion of the dissolved monovalent salt, and/or
      the precipitating comprises adjusting the temperature of the concentrated saline stream.

2. The method of claim 1, wherein a concentration of the dissolved monovalent salt within the concentrated saline stream differs from a concentration of the dissolved monovalent salt within the ion-diminished stream by no more than about 20%.

3. The method of claim 1, wherein the ion-removal apparatus comprises an ion-removal medium contained within a vessel, and the ion-removal medium comprises a composition configured to induce precipitation of the at least one scale-forming ion.

4. The method of claim 1, wherein the at least one scale-forming ion comprises $Mg^{2+}$, $Ca^{2+}$, $Sr^{2+}$, and/or $Ba^{2+}$.

5. The method of claim 1, comprising transporting the gaseous stream to a dehumidifier and condensing at least a portion of the water within the gaseous stream.

6. The method of claim 1, wherein the precipitating comprises reducing the flow velocity of the concentrated saline stream.

7. The method of claim 6, wherein the reducing the flow velocity of the concentrated saline stream comprises substantially stopping the flow of the concentrated saline stream.

8. The method of claim 1, wherein the precipitating comprises adjusting the temperature of the concentrated saline stream.

9. The method of claim 1, wherein the bulk concentration of at least one of the dissolved monovalent salts within the concentrated saline stream exiting the desalination apparatus can be increased by at least about 1% without reaching a saturation limit.

10. The method of claim 1, wherein, during operation, at least about 1 wt % of the concentrated saline stream that enters the precipitation apparatus is precipitated as a solid salt in the precipitation apparatus.

11. The method of claim 1, wherein there are substantially no regions within the desalination apparatus in which the ion-diminished stream is quiescent.

12. The method of claim 1, comprising removing at least one of the ion-removal apparatus, the desalination apparatus, and/or the precipitation apparatus while performing the method.

13. The method of claim 1, wherein the precipitating comprises forming crystals comprising at least a portion of the dissolved monovalent salt.

14. The method of claim 1, wherein the precipitating comprises precipitating, within the precipitation apparatus, sodium chloride.

15. The method of claim 1, wherein the recycling comprises recycling at least the portion of the product stream from the precipitation apparatus to the desalination apparatus via a direct fluidic connection between the precipitation apparatus and the desalination apparatus.

16. A method for desalinating water, comprising:
    removing, within a desalination apparatus, water from an aqueous feed stream, the aqueous feed stream comprising at least one dissolved monovalent salt comprising a monovalent cation and a monovalent anion to produce a concentrated saline stream enriched in the dissolved monovalent salt relative to the aqueous feed stream;
    precipitating, within a precipitation apparatus, at least a portion of the dissolved monovalent salt from the concentrated saline stream to produce a product stream containing less of the dissolved monovalent salt relative to the concentrated saline stream; and
    recycling at least a portion of the product stream to the desalination apparatus;
    wherein substantially no precipitation of the dissolved monovalent salt occurs within the desalination apparatus; and wherein:
the precipitating comprises forming crystals comprising at least a portion of the dissolved monovalent salt, and/or
the precipitating comprises adjusting the temperature of the concentrated saline stream.

17. The method of claim 16, wherein the removing comprises contacting a gaseous stream with the aqueous feed stream within a humidifier to evaporate water from the aqueous feed stream into the gaseous stream.

18. The method of claim 16, wherein the precipitating comprises forming crystals comprising at least a portion of the dissolved monovalent salt.

19. The method of claim 16, wherein the precipitating comprises adjusting the temperature of the concentrated saline stream.

20. The method of claim 16, wherein the precipitating comprises precipitating, within the precipitation apparatus, sodium chloride.

21. The method of claim 16, wherein the recycling comprises recycling at least the portion of the product stream from the precipitation apparatus to the desalination apparatus via a direct fluidic connection between the precipitation apparatus and the desalination apparatus.

22. A water desalination system, comprising:
an ion-removal apparatus configured to receive an aqueous feed stream, the aqueous feed stream comprising at least one scale-forming ion and at least one dissolved monovalent salt, and to remove at least a portion of the at least one scale-forming ion to produce an ion-diminished stream containing less of the scale-forming ion relative to the feed stream;
a desalination apparatus fluidically connected to the ion-removal apparatus and configured to remove water from the ion-diminished stream to produce a concentrated saline stream enriched in the dissolved monovalent salt relative to the ion-diminished stream;
a precipitation apparatus fluidically connected to the desalination apparatus and configured to precipitate at least a portion of the dissolved monovalent salt from the concentrated saline stream to produce a product stream containing less of the dissolved monovalent salt relative to the concentrated saline stream, wherein the precipitation apparatus comprises a crystallizer; and
a recycle stream directly fluidically connecting the precipitation apparatus to the desalination apparatus and configured to recycle at least a portion of the product stream from the precipitation apparatus to the desalination apparatus.

23. The system of claim 22, wherein the desalination apparatus comprises:
a humidifier configured to evaporate water from the ion-diminished stream to produce a vapor-containing gaseous stream and the concentrated stream, and
a dehumidifier fluidically connected to the humidifier and configured to condense at least a portion of the water from the gaseous stream,
wherein the dehumidifier comprises a bubble column condenser.

* * * * *

UNITED STATES PATENT AND TRADEMARK OFFICE
CERTIFICATE OF CORRECTION

PATENT NO.         : 10,308,537 B2
APPLICATION NO.    : 14/494101
DATED              : June 4, 2019
INVENTOR(S)        : Prakash Narayan Govindan et al.

It is certified that error appears in the above-identified patent and that said Letters Patent is hereby corrected as shown below:

In the Claims

At Column 47, Claim 1, Line 39, the words "monovalent anion to produce" should read --monovalent anion, to produce--

At Column 48, Claim 16, Line 55, the words "monovalent anion to produce" should read --monovalent anion, to produce--

Signed and Sealed this
Thirtieth Day of July, 2019

Andrei Iancu
*Director of the United States Patent and Trademark Office*